United States Patent [19]

Yamaguchi et al.

[11] Patent Number: 5,276,802
[45] Date of Patent: Jan. 4, 1994

[54] PRINTER CONTROL SYSTEM

[75] Inventors: Ikunori Yamaguchi; Yoshikazu Ikenoue, both of Osaka, Japan

[73] Assignee: Minolta Camera Kabushiki Kaisha, Osaka, Japan

[21] Appl. No.: 529,734

[22] Filed: May 29, 1990

Related U.S. Application Data

[63] Continuation of Ser. No. 170,446, Mar. 18, 1988, abandoned.

[30] Foreign Application Priority Data

Mar. 20, 1987 [JP] Japan .................................. 62-67041

[51] Int. Cl.⁵ .......................... G06F 15/00; G06F 3/12
[52] U.S. Cl. .................................... 395/164; 395/162; 395/110; 400/62; 400/70
[58] Field of Search ................. 364/519, 200; 400/124, 400/62, 70, 279; 340/747, 750; 395/162–165, 110

[56] References Cited

U.S. PATENT DOCUMENTS

| | | | |
|---|---|---|---|
| 4,063,221 | 12/1977 | Watson et al. | 364/900 |
| 4,426,166 | 1/1984 | Bowling | 400/62 |
| 4,710,886 | 12/1987 | Heath | 364/519 |
| 4,754,428 | 6/1988 | Schultz et al. | 364/900 |

FOREIGN PATENT DOCUMENTS 2156558 10/1985 United Kingdom .

OTHER PUBLICATIONS

Hays et al. "Standard Printer or I/O Adapter Control Method and Apparatus" IBM Technical Disclosure Bulletin vol. 22 No. 1–Jun. 1979 pp. 269–271.

Mohamed Rafiquzzaman "Microprocessors and Microcomputer Development Systems", pp. 99–100, Harper & Row, Publishers.

Primary Examiner—Phu K. Nguyen
Agent, Attorney, or Firm—Burns, Doane, Swecker & Mathis

[57] ABSTRACT

A printer control system for a printer apparatus connected to an information processing unit is herein proposed which includes a mechanism for forming a visible image on a sheet medium, a first memory device for storing a first program for deciphering instructions received from the information processing unit for enabling the mechanism for forming a visible image to operate in accordance with the instructions, a second memory device for storing a second program for converting instructions received from the information processing unit into those which can be deciphered by the first memory device, and a control device for executing the first and second programs to control the operation of the printer apparatus, wherein the first and second programs are to be executed at controlled timings.

15 Claims, 23 Drawing Sheets

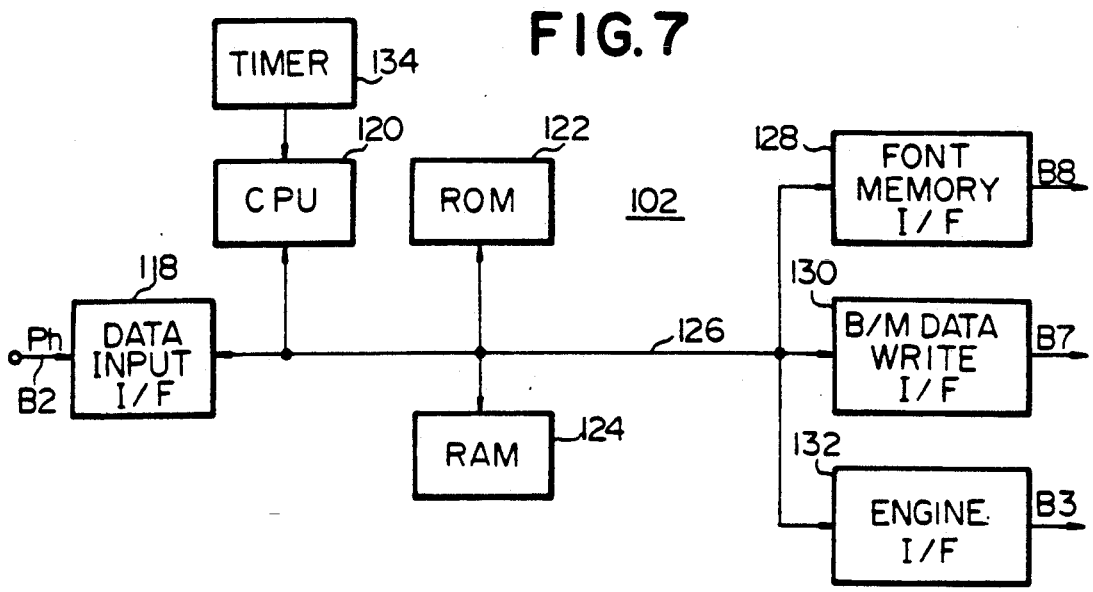
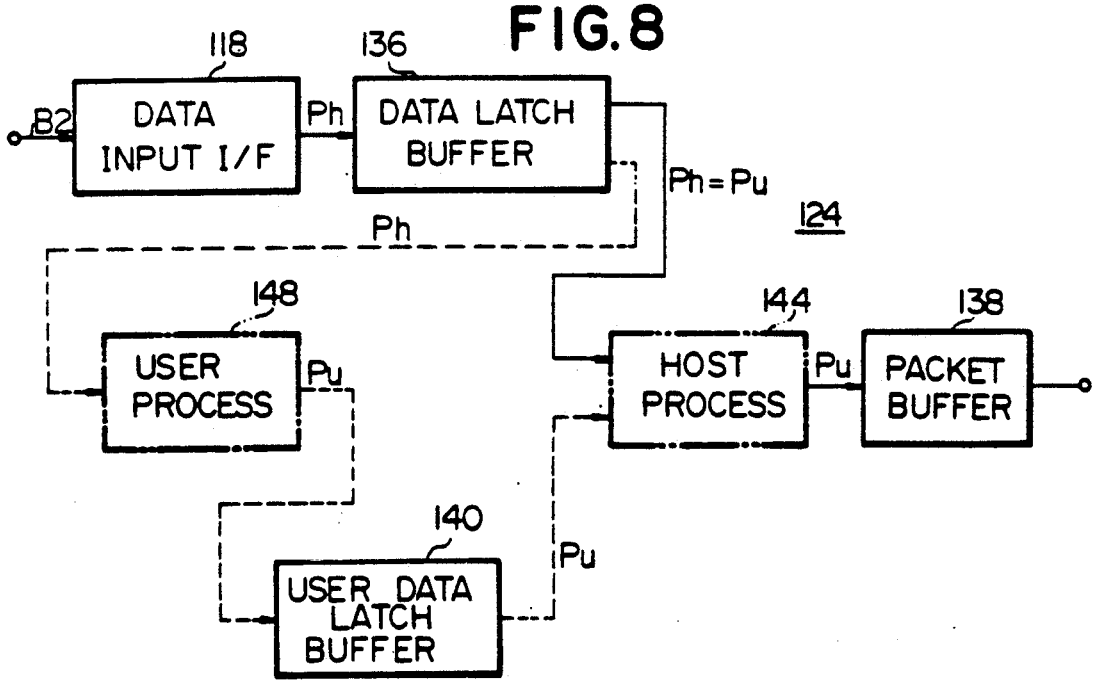

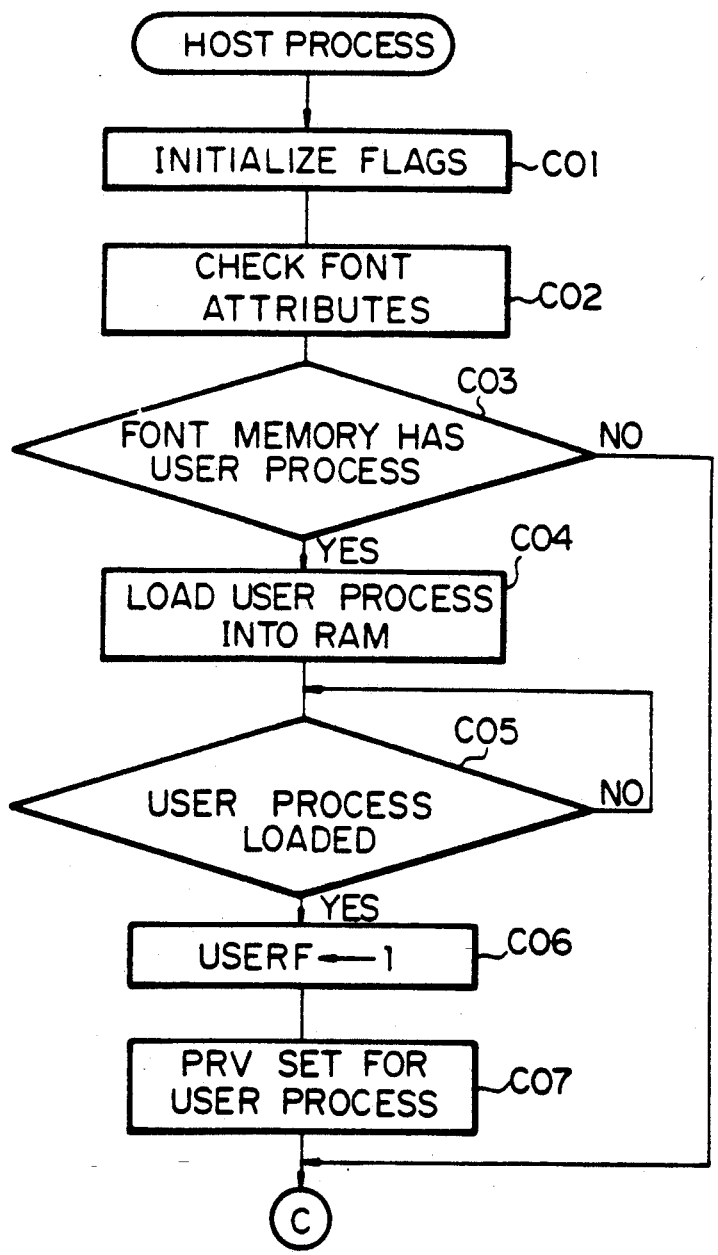

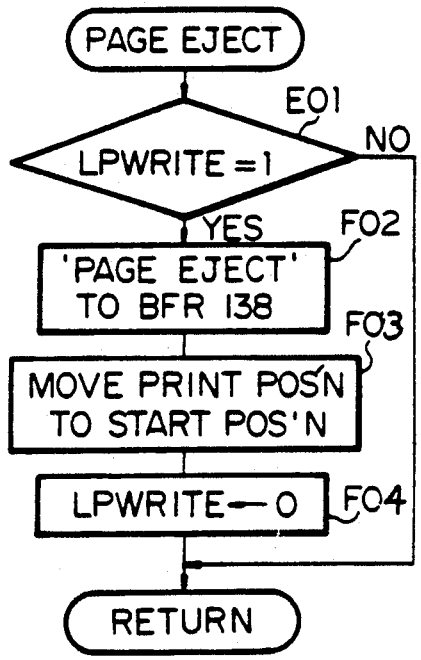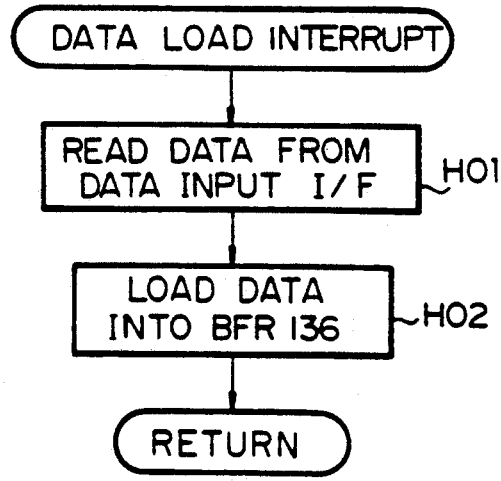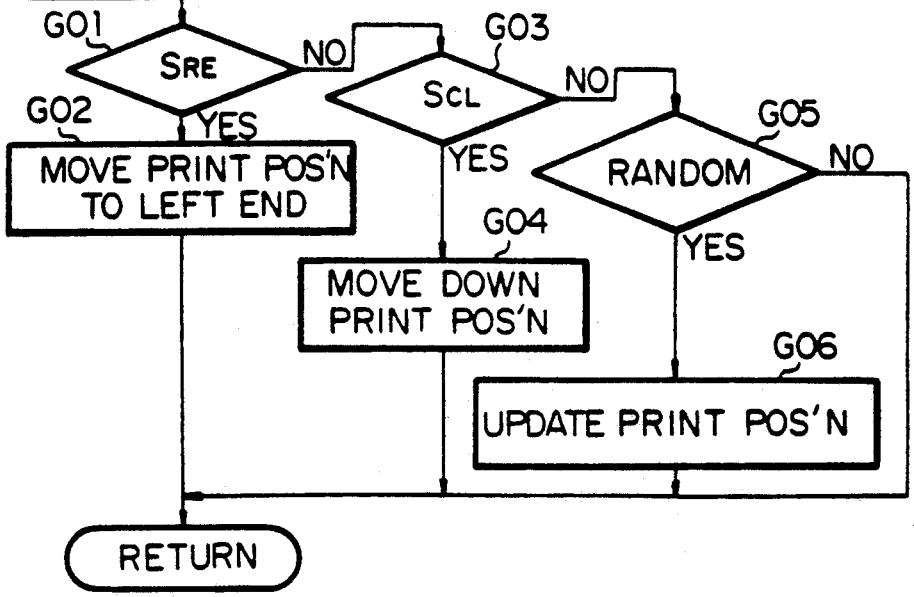

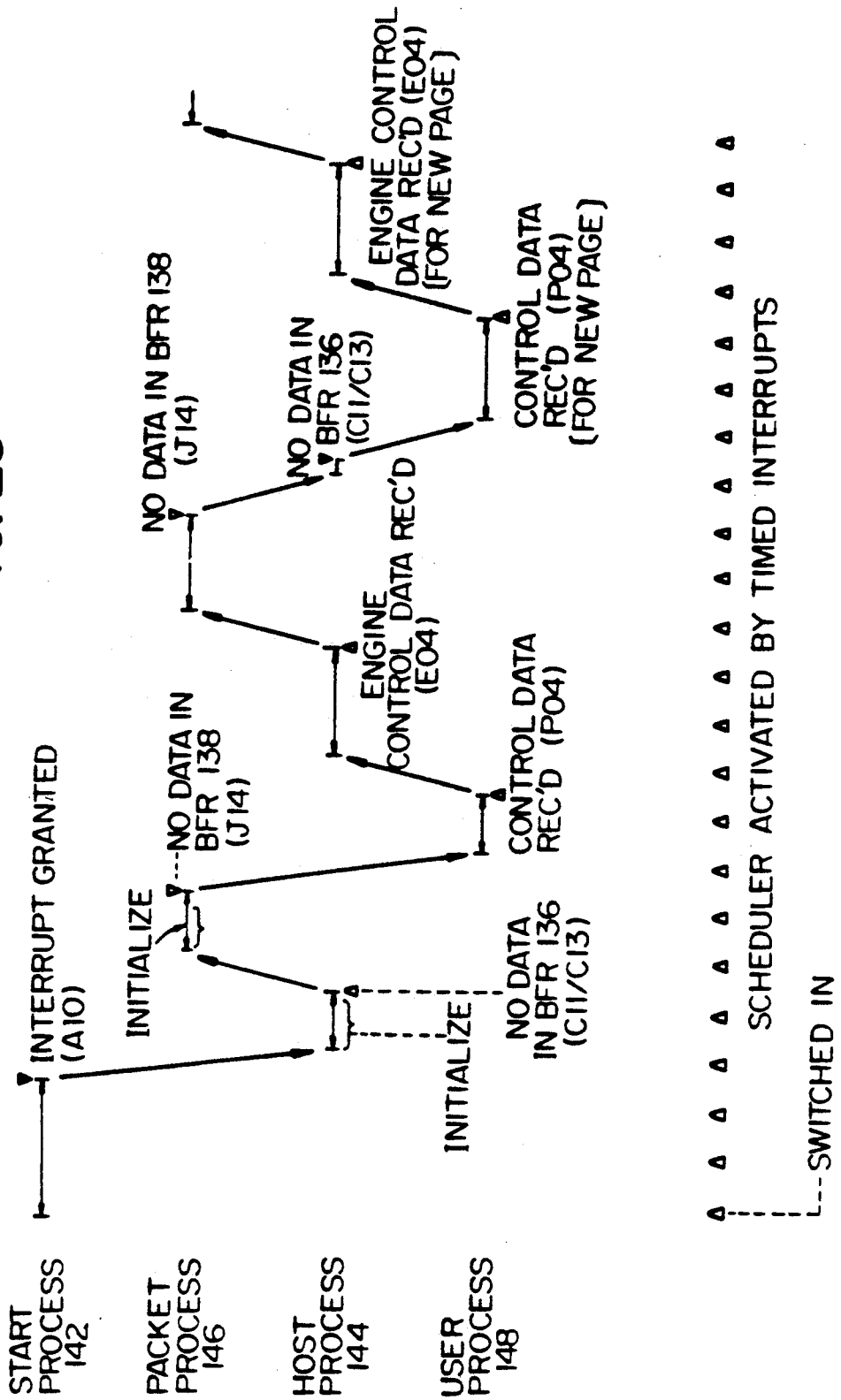

PRINTER CONTROL SYSTEM

This application is a continuation of application Ser. No. 170,446, filed Mar. 18, 1988, now abandoned.

FIELD OF THE INVENTION

The present invention relates to a printer control system compatible with data processing units using different protocols.

BACKGROUND OF THE INVENTION

Various, pieces of information such as control data and image data are transmitted between a host system implemented by a data processing unit and an input/output unit implemented by, for example, a printer apparatus in an information processing equipment such as a computer. The transmission of data between such a host system and an input/output unit is dictated by a communications protocol which consists of rules and formats governing the communications therebetween. In order that the host system and input/output unit operate on such a communications protocol, the protocol must be decipherable by both the host system and the input/output unit. In this instance, it is an ordinary practice that the protocol for the input/output unit be determined or selected to conform to that adopted in the host system and, for this reason, a printer apparatus which is typical of the input/output unit is developed for exclusive use with the host system. If a protocol different from that used in the host system is to be adopted for an input/output unit, the input/output unit is required to be equipped with any protocol converter convert the protocol of the host system into the protocol used in the input/output unit.

A representative example of such a protocol converter has incorporated therein a program by means of which the control data output from the host system is to be converted into corresponding data operable in the input/output unit. The conversion program is activated by a control data processor provided in the input/output unit. In an input/output unit using such a control data processor, it is further required that the control data once converted from the protocol of the host system be further converted into the form of internal parameters effective to control the various modes and phases of operation of the printer apparatus.

A conventional protocol converter which has thus far been in use is however such that an input/output unit, to be compatible with two or more host systems, is required to incorporate protocol conversion programs corresponding in number to the host systems to which the input/output unit is to be coupled. Where it is desired that an input/output unit be connected to a larger number of host systems, the input/output unit is thus required to incorporate as many protocol conversion programs each including the larger number of steps. It is further pointed out that, when the input/output unit having such a large number of protocol conversion programs is operating with a single host system, only one of the programs is activated with the remaining programs maintained out of use. This results in a low performance efficiency in the development of the programs and in implementing the programs into the input/output unit.

A protocol conversion program tailored to the protocol used in an input/output unit may be stored in a memory device of the read only type which is detachably incorporated into the input/output unit. Such a protocol conversion program is exchangeable with another one when the input/output unit is to be used in combination with another host system. Efforts required to develop such a protocol conversion program are however not less serious than those required for the development of the conversion programs for use in an input/output unit of the type to incorporate a number of programs. Added amounts of cost and labor are further required for the fabrication of the read-only memory device. Thus, using a single input/output unit such as a printer apparatus connectable to a number of host systems has been objectionable from the viewpoint of performance efficiency.

With a view to providing a solution to such problems, a printer control system has been proposed in copending U.S. patent application Ser. No. 07/085,409 filed Aug. 14, 1987 (which corresponds to Japanese Patent Application No. 61-191683). The proposed printer control system comprises conversion means by which control data output from a data processing unit using a protocol different from the printer apparatus is to be converted into a protocol workable in the printer apparatus and control means responsive to the control data with the converted protocol for controlling the various functions of the printer apparatus. The printer control system is characterized in that the control means is provided in the form of a conversion table. Various user pps are now used in commercially available printers and include those which could not be coped with by means of such a conversion table, a typical example of such a protocol being of the type which controls a font memory.

SUMMARY OF THE INVENTION

In accordance with the present invention, there is provided a printer control system for a printer apparatus connected to an information processing unit, comprising
a) means for forming a visible image on a sheet medium,
b) first memory means for storing a first program for deciphering instructions received from the information processing unit for enabling the image forming means to operate in accordance with the instructions,
c) second memory means for storing a second program for converting instructions received from the information processing unit into those which can be deciphered by the first memory means, and
d) control means for executing the first and second programs at controlled timings.

BRIEF DESCRIPTION OF THE DRAWINGS

The drawbacks of a prior-art printer control system and the features and advantages of a printer control system according to the present invention will be more clearly understood from the following description taken in conjunction with the accompanying drawings in which:

FIG. 7 is a block diagram showing the detailed circuit arrangement of a preferred example of the bit-map control circuit which forms part of the bit-map data processing network illustrated in FIG. 6;

FIG. 8 is a block diagram showing the buffer arrangement included in the system RAM (random-access memory) unit incorporated in the bit-map control circuit illustrated in FIG. 7;

FIGS. 15A and 15B are flowcharts which show the host process program stored in the system ROM unit;

FIG. 18 is a flowchart showing the PAGE EJECT subroutine included in the data processing subroutine illustrated in the flowcharts of FIGS. 17A and 17B;

FIG. 19 is a flowchart showing the format control subroutine also included in the data processing subroutine illustrated in the flowcharts of FIGS. 17A and 17B;

FIG. 20 is a flowchart showing the data loading interrupt subroutine which controls the loading of data through the data input interface section into an initial buffer register included in the system RAM unit incorporated in the bit-map control circuit illustrated in FIG. 7;

FIG. 28 is a diagram showing the timings at which the host, packet and user process programs are to be executed in response to the times interrupts from the cpu.

DESCRIPTION OF THE PRIOR ART

Figure 1:
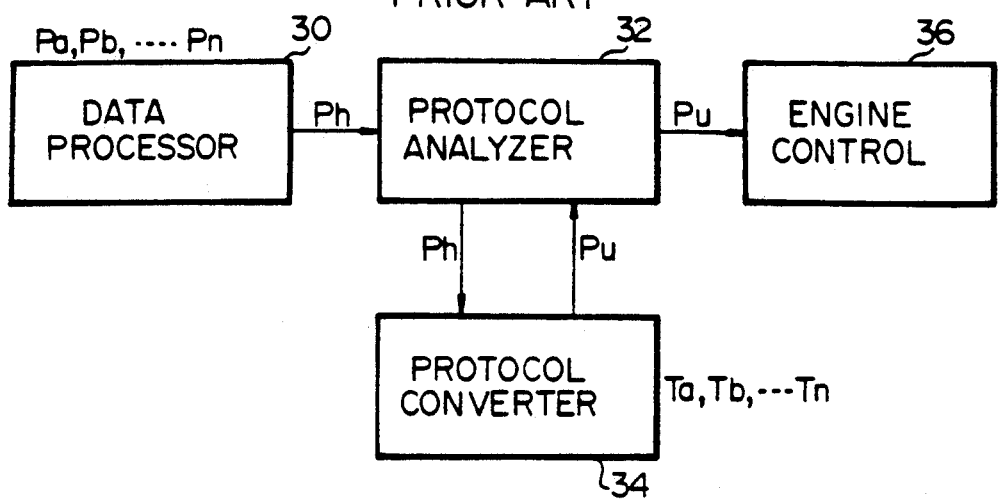
FIG. 1 is a view showing the flows of data as used for the conversion of a host protocol into a user protocol by means of a known printer control system.

In FIG. 1 are shown the flows of data as used for the conversion of pps in a printer control system disclosed in the copending U.S. patent application Ser. No. 07/085,409. Data supplied from any one of various data processor units 30 having different communications pps Pa, Pb, ... Pn, respectively, is analyzed by a protocol analyzer 32 for determination of the protocol, $P_h$, which governs the transmission of data from the data processor unit 30. The protocol analyzer 32 analyzes the communications protocol $P_h$ used by the data processor unit 30 and selects any one of conversion tables Ta, Tb, ... Tn formulated in a protocol converter 34 for each of the processes to be executed by the printer apparatus. In this instance, the proper one of the conversion tables Ta, Tb, ... Tn in the protocol converter 34 may be selected either by means of hardware using a dip (duel in-line package) switch, not shown, or by means of software using a command signal which may be supplied from the data processor unit 30 in use. The communications protocol $P_h$ for the transmission of data from the data processor unit 30 being thus determined and converted into a protocol $P_u$ workable in the printer apparatus, the data processor unit 30 in use is operatively coupled to a print engine control unit 36 of the printer control system. If none of the conversion tables Ta, Tb, ... Tn stored in the protocol converter 34 is found effective for the conversion of the protocol $P_h$ adopted by the data processor unit 30, any one of the conversion tables Ta, Tb, ... Tn presently available may be modified by the user of the printer. In the description to follow, the communications protocol $P_h$ used in the data processor unit 30 which is in control of the printer apparatus will be referred to as host protocol while the protocol $P_u$ workable in the printer apparatus which acts as the "user" of the data processor unit will be referred to as user protocol.

Various user pps are now used in commercially available printers and include those which could not be coped with by means of such conversion tables as used in a printer control system proposed in the copending U.S. Patent Application. Examples of such user pps include those which control font memories. The present invention contemplates provision of a printer control system which makes a printer apparatus using a specific user protocol with data processor units using different host pps.

DESCRIPTION OF THE PREFERRED EMBODIMENTS

Figure 2:
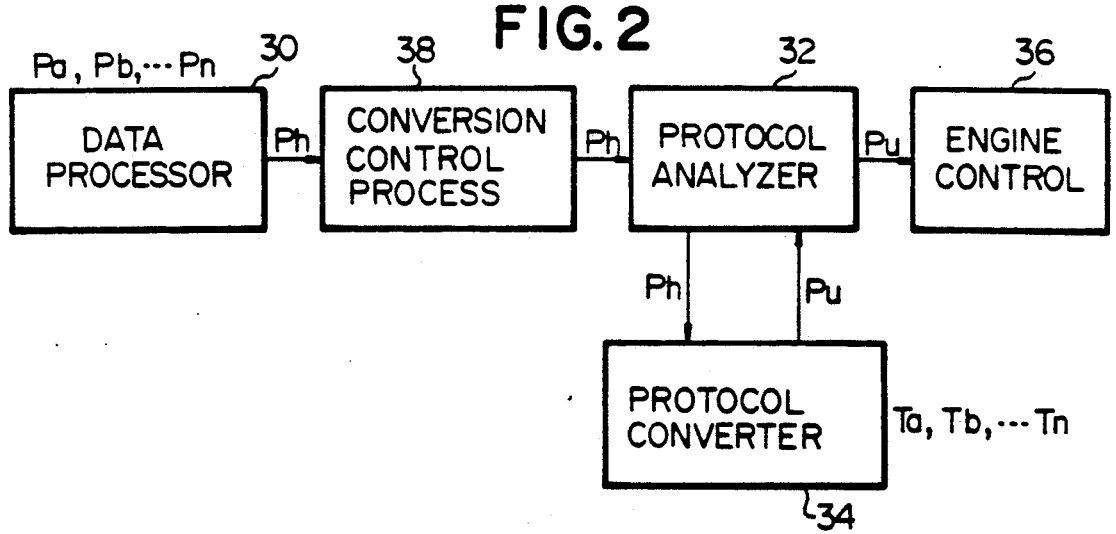
FIG. 2 is a view similar to FIG. 1 but shows the flows of data as used for the conversion of pps in a printer control system according to the present invention.

FIG. 2 shows the flows of data as used for the conversion of pps in a printer control system proposed by the present invention. As in the flows of data shown in FIG. 1, data may be supplied from any one of various data processor units 30 having different host pps Pa, Pb, ... Pn, respectively. The host protocol, $P_h$, dictating the transmission of data from one of the data processor units 30 is analyzed by a protocol analyzer 32 from the data thus supplied from the particular data processor unit 30 and is converted into a user protocol $P_u$ workable in the printer apparatus by means of a protocol converter 34. The protocol converter 34 in the printer control system proposed by the present invention has incorporated therein a single conversion table adapted to convert a given host protocol into the user protocol $P_u$ particularly used in the printer apparatus and thus acceptable in a print engine control unit 36 of the printer control system. Anterior to the protocol analyzer 32, a protocol conversion control process stage 38 is provided which is composed of either a plurality of different conversion processor units or a single programmable conversion processor unit. In the programmable conversion processor unit or each of the different conversion processor units of such a protocol conversion control process stage 38, the rules and formats in accordance with which a given host communications protocol is to be converted into the user protocol $P_u$ workable in the printer apparatus are formulated.

Figure 3:
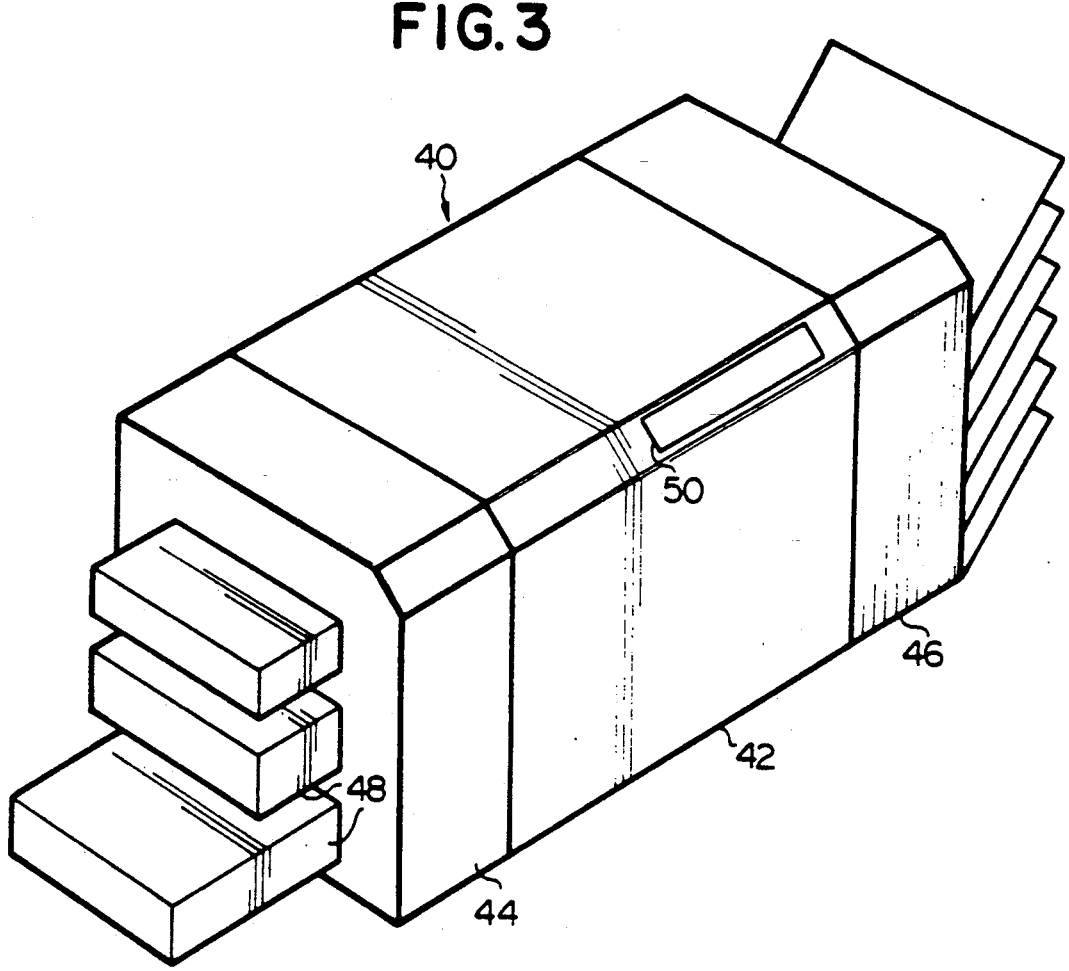
FIG. 3 is a schematic perspective view showing an example of a printer apparatus into which a printer control system according to the present invention may be incorporated.

FIG. 3 shows an example of a printer apparatus 40 into which a printer control system according to the present invention may be incorporated. As shown, the printer apparatus 40 is herein assumed to largely consist of a print engine 42 which may be implemented by a known electrophotographic image reproducing system provided with a record medium supply unit 44 and a print output unit 46. The record medium supply unit 44 may be implemented by a paper feed unit for an ordinary image duplicating apparatus, and the print output unit 46 is shown represented by a page sorter. The paper feed unit implementing the record medium supply unit 44 is shown to be of the type using detachable paper supply cassettes 48 by way of example. Such a printer apparatus 40 has provided on the print engine 42 a control panel 50 which may be configured as illustrated in FIG. 4.

Figure 4:
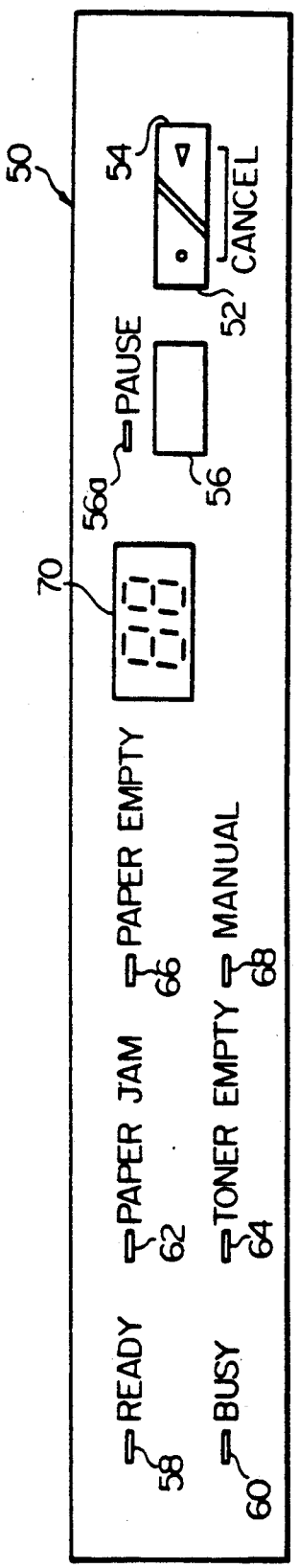
FIG. 4 is a plan view showing an example of the configuration of a control panel which may form part of the printer apparatus illustrated in FIG. 3.

Referring to FIG. 4, the control panel 50 of the printer apparatus 40 herein under consideration comprises switches which include a test print start switch 52, a shift switch 54 and a print pause switch 56. The test print start switch 52 is used to start test print operation when the switch 52 alone is depressed. When the test print start switch 52 is depressed with the shift switch 54 depressed concurrently, the test print operation which has once been started is interrupted or a request for such operation is cancelled. The test print operation once started can also be interrupted with the print pause switch 56 depressed after the test print start switch 52 is depressed. When the print pause switch 56 is depressed, an associated indicator 56a is turned on so as to be illuminated. On the control panel 50 are further provided indicators which include an indicator 58 to indicate that the apparatus 40 is in a condition ready for printing operation, an indicator 60 to indicate that the apparatus 40 is in a condition busy in printing operation, and an indicator 62 to indicate that jamming of copy paper is caused within the apparatus 40 during printing operation. The indicators on the control panel 50 further include an indicator 64 to indicate that there is no storage of developer agent such as toner in the apparatus 40, an indicator 66 indicate that there is no storage of record medium such as copy paper in any of the paper supply cassettes 48, and an indicator 68 to indicate that a manual paper feed mode is established in the printer apparatus 40. Each of these indicators 56a and 58 to 68 may be implemented by a light emitting diode (LED). On the control panel 50 is further provided a seven-segment type numerical display window 70 for indicating the selected number of prints to be output for a single printing operation. The configuration of the control panel 50 herein shown is simply for purposes of illustration and is not limitative of the functions available in a printer apparatus to which a printer control system according to the present invention is applicable.

Figure 5:
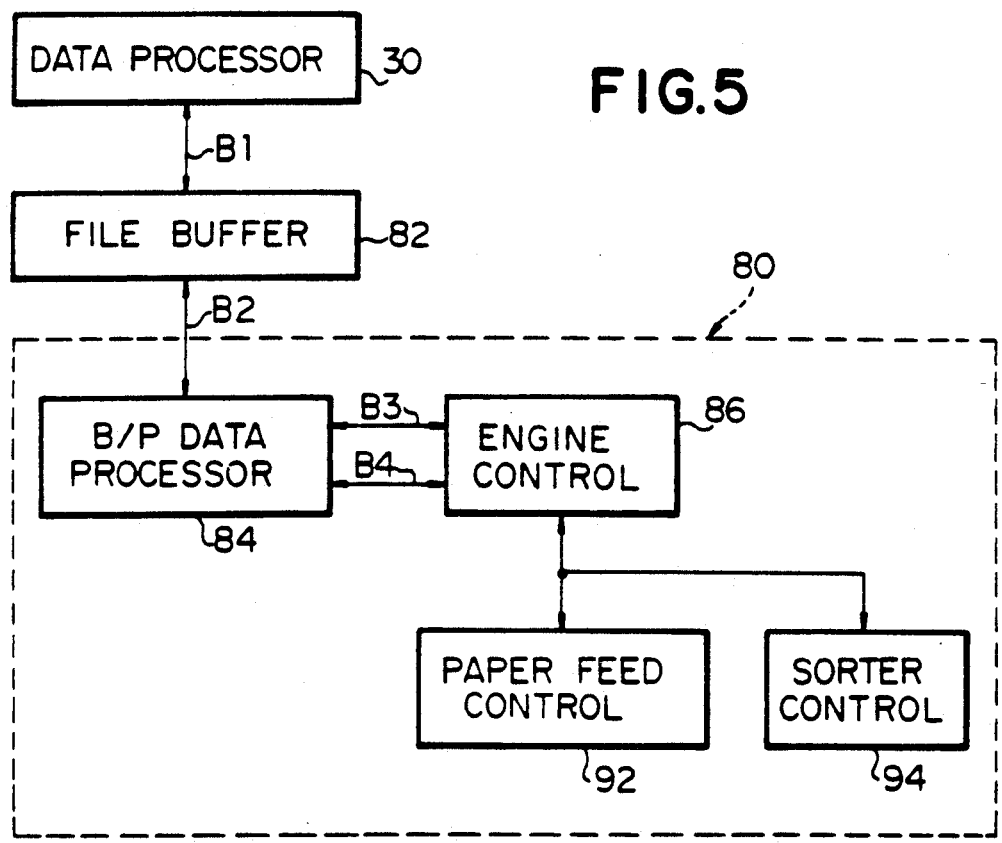
FIG. 5 is a block diagram showing the general arrangement of a printer control system embodying the present invention as coupled with a standard data processor unit.

FIG. 5 shows the general arrangement of a printer control system embodying the present invention. The printer control system, generally represented by reference numeral 80, is coupled with a standard data processor unit 30 preferably through a file buffer circuit 82 by way of buses B1 and B2. The data processor unit 30 used herein supplied data including those representative of a graphic image and those representative of the program in accordance with which the image is to be reproduced and printed in the printer apparatus 40 under consideration. Such data is output from the data processor unit 30 in accordance with prescribed rules and formats which form a particular communications protocol.

The data thus supplied from the data processor unit 30 through the bus B1 is once stored in the file buffer circuit 82 and is thereafter supplied through the bus B2 to the printer control system 80, particularly to a bit-map data processing network 84 which forms part of the printer control system 80. The printer control system 80 comprises, in addition to the data processing network 84, a print engine control network 86 which communicates with the data processing network 84 by way of a control data bus B3 or through an image data bus B4 as shown. The print engine control network 86 in turn is connected to a paper feed control circuit 92 to control the paper feed unit implementing the record medium supply unit 44, and a sorter control circuit 94 to control the page sorter which represents the print output unit 46 of print engine 42 of the printer apparatus 40 embodying the present invention. The detailed configurations of preferred examples of the bit-map data processing network 84 and print engine control network 86 are depicted in FIG. 6.

Figure 6:
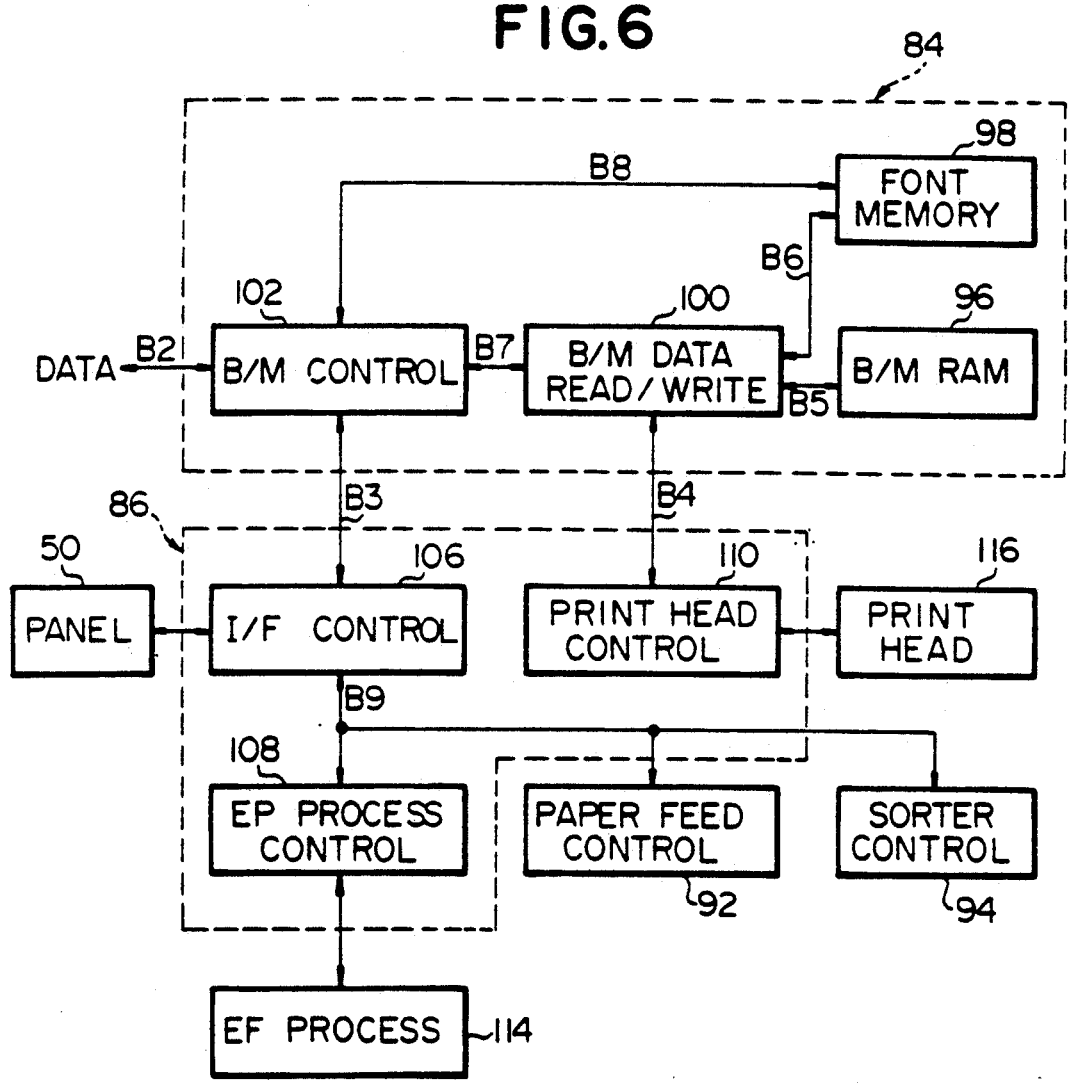
FIG. 6 is a block diagram showing the detailed configurations of preferred example of the data processing and print engine control nws incorporated in the printer control system illustrated in FIG. 5.

Referring to FIG. 6, the bit-map data processing network 84 comprises memory means including a bit-map random-access memory (RAM) unit 96 for storing graphic image information, and a font memory unit 98 which has a collection of alphanumerical font data fixedly stored therein. The data processing network 84 further comprises a bit-map data read/write circuit 100 for loading bit-map graphic data into the RAM unit 96 through a bus B5 and a bit-map control circuit 102 responsive to data from the file buffer circuit 82 through a bus B6 and connected through a bus B7 to the bit-map data read/write circuit 100. Upon receipt of data from the file buffer circuit 82 through the bus B2, the bit-map control circuit 102 outputs intermediate code signals, on the basis of which the bit-map memory unit 96 is accessed at any of the addresses thereof and/or the font memory unit 98 is accessed at any of the addresses thereof through the bit-map read-write circuit 100 and by way of the buses B5 and B6, respectively, as will be described in more detail. The bit-map control circuit 102 is also connected through a bus B8 to the font memory unit 98 as shown.

On the other hand, the print engine control network 86 comprises three control circuits which consist of an interface control circuit 106, an electrophotographic process control circuit 108, and a print head control circuit 110. The interface control circuit 106 processes the data received from the bit-map control circuit 102 through the control data bus B3 and controls the selective activation of the indicators 56a and 58 to 68 and display window 70 on the control panel 50 shown in FIG. 4. The interface control circuit 106 is further operative to control the timings at which the various functional units and members incorporated in the print engine 42 shown in FIG. 3 are to be activated and deactivated. Such timings are controlled by signals transmitted through an internal bus B9 in the print engine control network 86. The electrophotographic process control circuit 108 is responsive to the data supplied from the interface control circuit 106 through the internal bus B9 and dictates the operation of an electrophotographic process stage 114 incorporated in the print engine 42 of the printer apparatus 40. An electrophotographic process stage of a printer apparatus is per se well known in the art and for this reason will not be herein described to avoid prolixity of description.

The print head control circuit 110 is responsive to the data supplied from the bit-map data read/write circuit 100 through the graphic data bus B4 and dictates the operation of a print head 116 also incorporated in the print engine 42. The print head 116 incorporated in the print engine 42 of the printer apparatus 40 is assumed to be of the laser type by way of example and, thus, the print head control circuit 110 herein provided is operative to control the activation of, for example, a semiconductor laser generator and an associated control motor, though not shown in the drawings. The interface control circuit 106 is further connected through the internal bus B9 of the network 86 to the paper feed and sorter control circuits 92 and 94 to control the paper feed unit implementing the record medium supply unit 44 and the page sorter included in the print output unit 46 of the print engine 42.

FIG. 7 shows the detailed circuit arrangement of a preferred example of the bit-map control circuit 102 which thus forms part of the bit-map data processing network 84. As shown, the bit-map control circuit 102 comprises a data input interface section 118 connected through the file buffer circuit 82 to the data processor unit 30 (FIG. 5). The bit-map control circuit 102 further comprises a central processing unit 120, a system read-only memory (ROM) unit 122 and a system RAM unit 124 which are coupled together by a common bus 126 which extends from the data input interface section 118 to output interface sections. These output interface sections consist of a font memory interface section 128 connected to the font memory unit 98 through the bus B8, a data write interface section 130 connected to the bit-map data read/write circuit 100 through the bus B7, and a print engine interface section 132 connected to the interface control circuit 106 of the print engine control network 86 through the control data bus B3. The central processing unit 120 may be interrupted periodically by a timer circuit 134 which supplies a series of interrupt signals to the central processing unit 120.

FIG. 8 shows a preferred example of the buffer arrangement included in the system RAM unit 124 incorporated in the bit-map control circuit 102. As shown, the system RAM unit 124 comprises a R buffer register 136 for storing the data introduced into the bit-map control circuit 102 through the data input section 118 of the control circuit 102. The data thus stored into the R buffer register 136 is transferred to a packet buffer register 138 or may be passed to the packet buffer register 138 through a user R buffer register 140 after the host protocol $P_h$ dictating the data received is converted into the user protocol $P_u$ established in the printer apparatus 40 under consideration. The data thus passed to the R buffer register 136 or the user R buffer register 140 is re-formulated into packets as function-type intermediate code signals before the data is transferred to the packet buffer register 138.

Figure 9:
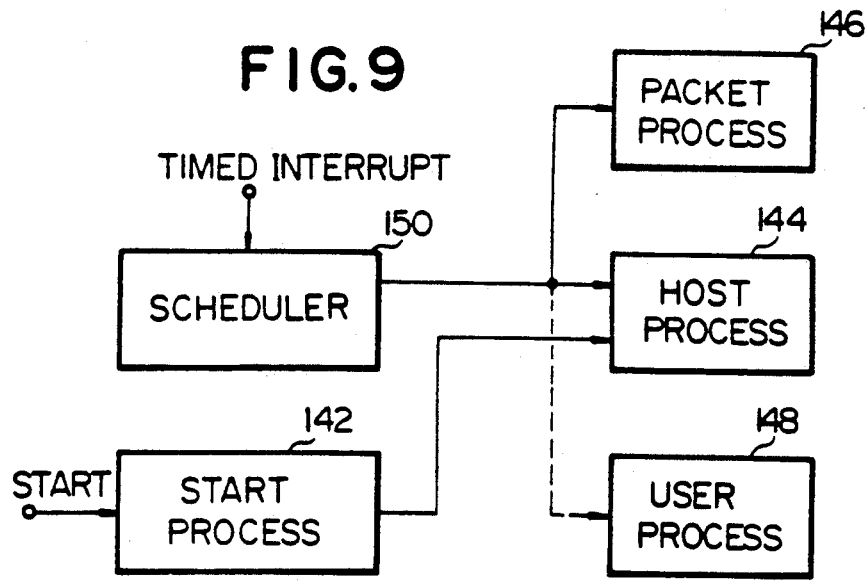
FIG. 9 is a block diagram showing the general internal configuration of the system ROM (read-only memory) unit incorporated in the bit-map control circuit illustrated in FIG. 7.

As illustrated in FIG. 9 which shows the general internal configuration of the system ROM unit 122, the ROM unit 122 has stored therein a start process program 142, a host process program 144 and a packet process program 146. Indicated at 148 is a user process program 148 which may be stored in the system RAM unit 124. The host process program 144 is used for reading the data from either the R buffer register 136 (as indicated by full line in FIG. 8) or from the user R buffer register 140 (as indicated by broken line in FIG. 8) and editing the data into the form of packets for storage into the packet buffer register 138. The data packets thus stored into the packet buffer register 138 are analyzed in accordance with the packet process program 146 to access the font memory unit 98 at any of the addresses of the memory unit through the font memory interface section 128. In addition, the data packets stored into the packet buffer register 138 are transmitted from the packet buffer register 138 to the bit-map data read/write circuit 100 by way of the data write interface section 130, and through the print engine interface section 132 to the interface control circuit 106 of the print engine control network 86. Upon receipt of such data, the bit-map data read/write circuit 100 controls access to the bit-map memory unit 96 to read data from the memory unit 96 at any of the addresses thereof. On the other hand, the user process program 148 loaded into the system RAM unit 124 is used for the conversion of the host protocol $P_h$ governing the data to be passed from the R buffer register 136 to the user R buffer register 140. The principle on the basis of which such conversion is to be made will become apparent as the description proceeds. The start process program 142 is executed to initialize the system data processor and all the memories, buffers and registers of the control system when the printer apparatus 40 is switched in. When the start process program 142 is executed, the host process program 144, packet process program 146 and user process program 148 are accessed successively in accordance with a prescribed order of priority dictated by a scheduler 150. They scheduler 150 also forms part of the system ROM unit 122 and is responsive to the interrupt signals supplied from the timer circuit 134 to the central processing unit 120.

Figure 10A:
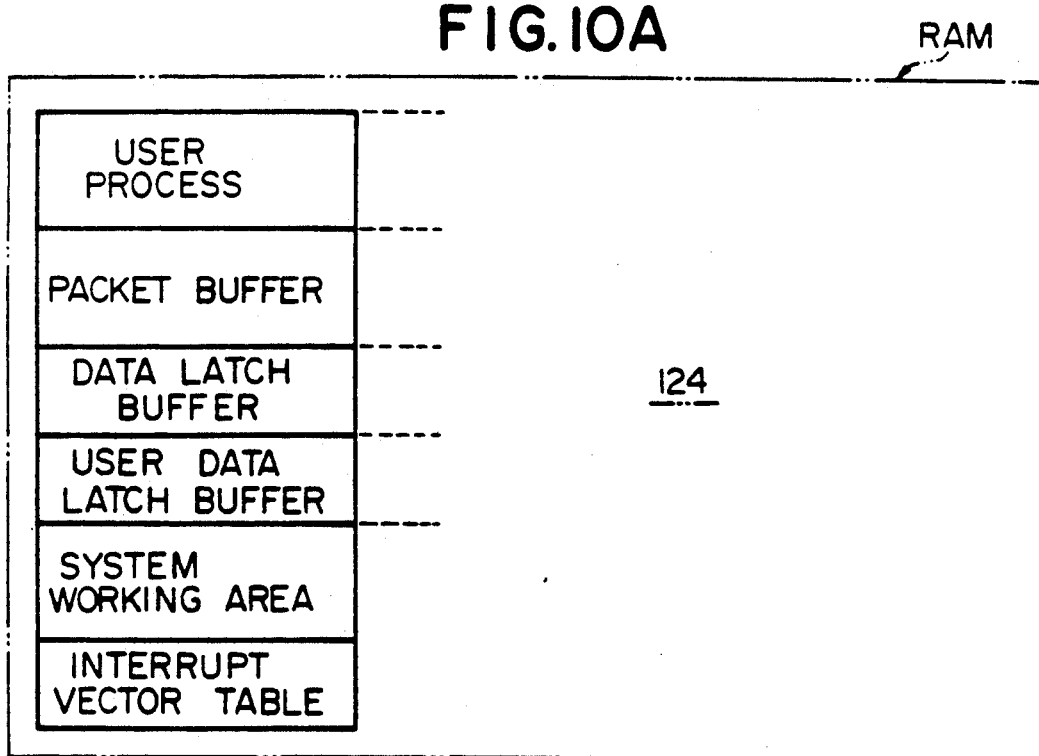
FIG. 10A is a block diagram showing the segment configuration of a portion of a system RAM unit forming part of the bit-map control circuit 102 shown in FIG. 7.

FIG. 10A shows the segment configuration of a portion of the memory area of the system RAM unit 124 also forming part of the bit-map control circuit 102 (FIG. 7) of the data processing network 84. The system RAM unit 124 has a download or first-in first-out (FIFO) segment into which the user process program 148 is to be loaded. The user process program 148 is herein assumed to be stored in the font memory unit 98 and may be loaded and stored into this FIFO segment of the RAM unit 124. If desired, however, the user process program 148 may be stored in the built-in ROM device incorporated in the central processing unit 120 or may be loaded from the data processor unit 30 into the system RAM 124 through first-in first-out buffering. As shown in FIG. 10A, the system RAM unit 124 further has memory areas to store data read from the R buffer, user R buffer and packet buffer registers 136, 138 and 140, respectively, a system work area, and an interrupt vector table area.

Figure 10B:
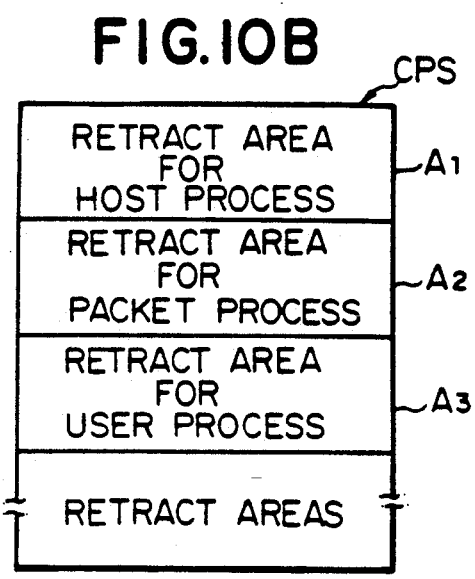
FIG. 10B is a block diagram showing the configuration of a memory space forming a current process status (CPS) block provided in the work area of the system RAM unit.

As shown in FIG. 10B, the system RAM unit 124 has with the system work area a memory space forming a current process status block (CPS). As shown in FIG. 10B, the current process status block CPS has a plurality of data retract areas which are shown including those retract areas $A_1$, $A_2$ and $A_3$ assigned to the host process program 146, packet process program 144, and user process program 148, respectively. The host, packet or user process program 144, 146 and 148 loaded into the central processing unit 120 may be withdrawn independently of each other into any of these retract areas $A_1$, $A_2$ and $A_3$ so that any of these process programs can be executed independently of the others.

Figure 11:
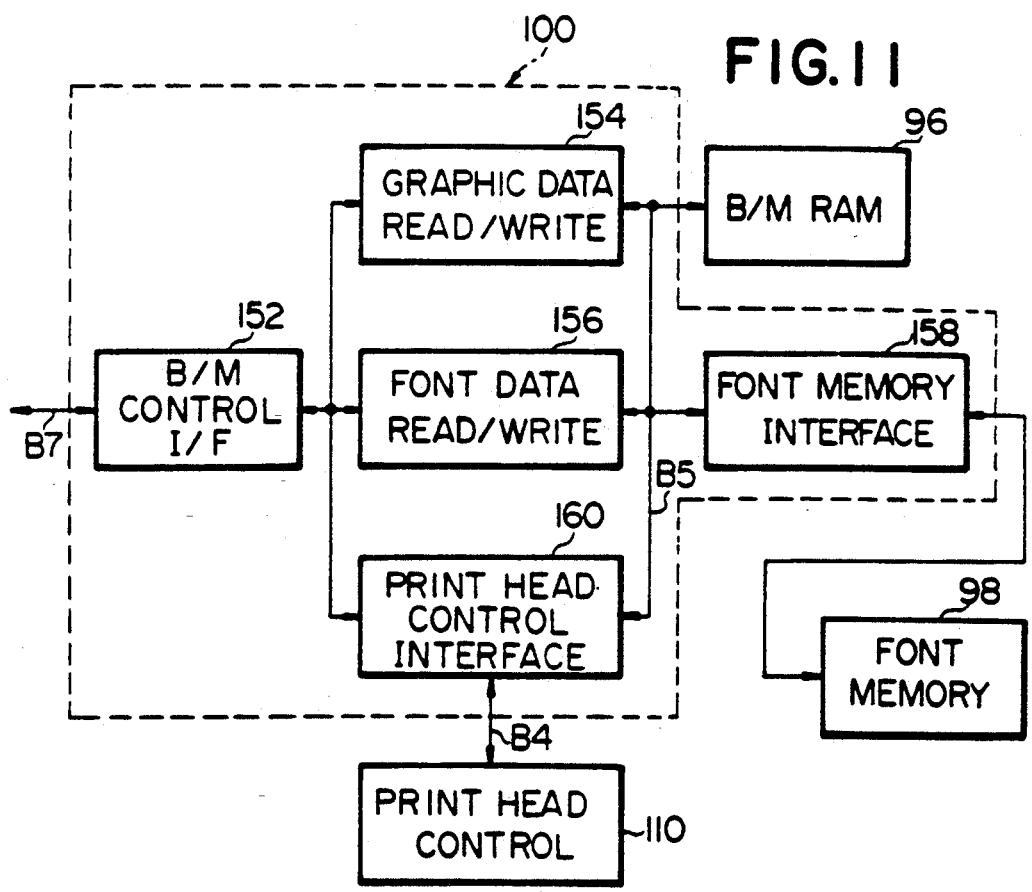
FIG. 11 is a block diagram showing an example of the detailed configuration of the bit-map data read/write circuit which forms part of the bit-map data processing network illustrated in FIG. 6.

Into the system RAM unit 124, the data supplied from the data processor unit 30 through the file buffer circuit 82 and data input interface section 118, or the data read from the font memory unit 98 and supplied through the font memory interface section 128 may be further stored, after being processed in accordance with the user process program 148. Thus, the user process program 148 is useful for processing not only the data supplied from the data processor unit 30 but also the data read from the font memory unit 98. Such processing of the data from the data processor unit 30 or the font memory unit 98 is effected also in a priority order dictated by the scheduler 150 included in the system ROM memory unit 122. As has been noted, the user process program 148 stored in the font memory unit 98 and loaded into the system RAM unit 124 is used so that the data which has been transmitted with any protocol other than that used in the printer apparatus 40 under consideration is converted into the protocol $P_u$ used in the printer apparatus 40. Thus, the data transmitted with the protocol $P_h$ incompatible with the printer apparatus 40 is first temporarily stored into the R buffer register 136 (FIG. 8) and, upon conversion of the host protocol $P_h$ in accordance with the user process program 148, transferred to the user R buffer register 140 via a data stream indicated by broken lines in FIG. 8. In these manners, the packet buffer register 138 receives data either directly from the R buffer register 136 without activating the user process program 148 or by way of the user R buffer register 140 upon activation of the user process program 148 for conversion of the protocol $P_h$ in the supplied data. No substantial change or modification in the host process program 144 per se is thus necessitated in processing data into packets if the data is received directly from the R buffer register 136 or by way of the user R buffer register 140. Data transmitted with any host protocol $P_h$ differing from that used in the printer apparatus 40 under consideration can be properly processed by the host process program 144 possibly with a slight modification made in the user process program 148. It may be further noted that no other process programs predominant over the various processes for printing operation need be changed or modified depending upon the protocol $P_h$ used in the data processor unit to be used in combination with the printer apparatus 40. For this reason, the user process program 148 may be formulated simply in such a manner as to be capable of converting any given host communications protocol into the protocol $P_u$ used in the printer apparatus 40 without processing the supplied data per se. 10A FIG. 11 shows an example of the detailed configuration of the bit-map data read/write circuit 100 which forms part of the bit-map data processing network 86 described with reference to FIG. 6. The major functions of the bit-map data read/write circuit 100 of the bit-map data processing network 86 include a function to write image data into the bit-map RAM unit 96 when such data is loaded into the apparatus 40. The bit-map data read/write circuit 100 has another function to read data from the RAM unit 96 for transmission to the print engine control unit 36 (FIG. 2) through the bit-map control circuit 102 during printing operation. Thus, the bit-map data read/write circuit 100 comprises a bit-map control interface circuit 152 connected through the bus B7 to the bit-map control circuit 102 of the bit-map data processing network 86.

Data may be written into or read out of the bit-map RAM unit 96 through a graphic data read/write control circuit 154 and/or a font dataread/write control circuit 156. Each of these graphic and font image data read/write control circuits 154 and 156 is composed of a logic network connected through the bit-map control interface circuit 152 to the bit-map control circuit 102 and operates on intermediate code signals supplied from the bit-map control circuit 102. The graphic data read/write control circuit 154 is connected between the bit-map control interface circuit 152 and the bit-map RAM unit 96 and controls the reading or writing of data representative of graphic features out of or into the RAM unit 96. In controlling the writing of data into the bit-map RAM unit 96, the read/write control circuit 154 processes the intermediate code signals received from the bit-map control circuit 102 mostly through analysis into such signals. On the other hand, the font data read/write control circuit 156 is connected between the bit-map control interface circuit 152 and font memory unit 98 through a font memory interface circuit 158 and controls the reading of alphanumerical data out of the font memory unit 98. In response to the intermediate code signals received from the bit-map control circuit 102, the read/write control circuit 156 reads data from the font RAM unit 98 and writes the data into the bit-map memory unit 96 without analyzing the intermediate code signals received from the bit-map control circuit 102.

The data read/write circuit 100 further comprises a print head control interface circuit 160 operative to read data from the bit-map RAM unit 96 under the control of the print head control circuit 110 forming part of the print engine control network 86. The print head control interface circuit 160 is responsive to a print start code signal supplied from the bit-map control circuit 102 through the bit-map control interface circuit 152 and to a synchronizing signal supplied from the print head control circuit 110 through the graphic data bus B4. In response to such signals from the bit-map and print head control circuits 102 and 110, the print head control interface circuit 160 transmits to the print head control circuit 110 of the print engine control network 86 the data which has been read out from the bit-map RAM unit 96.

Figure 12:
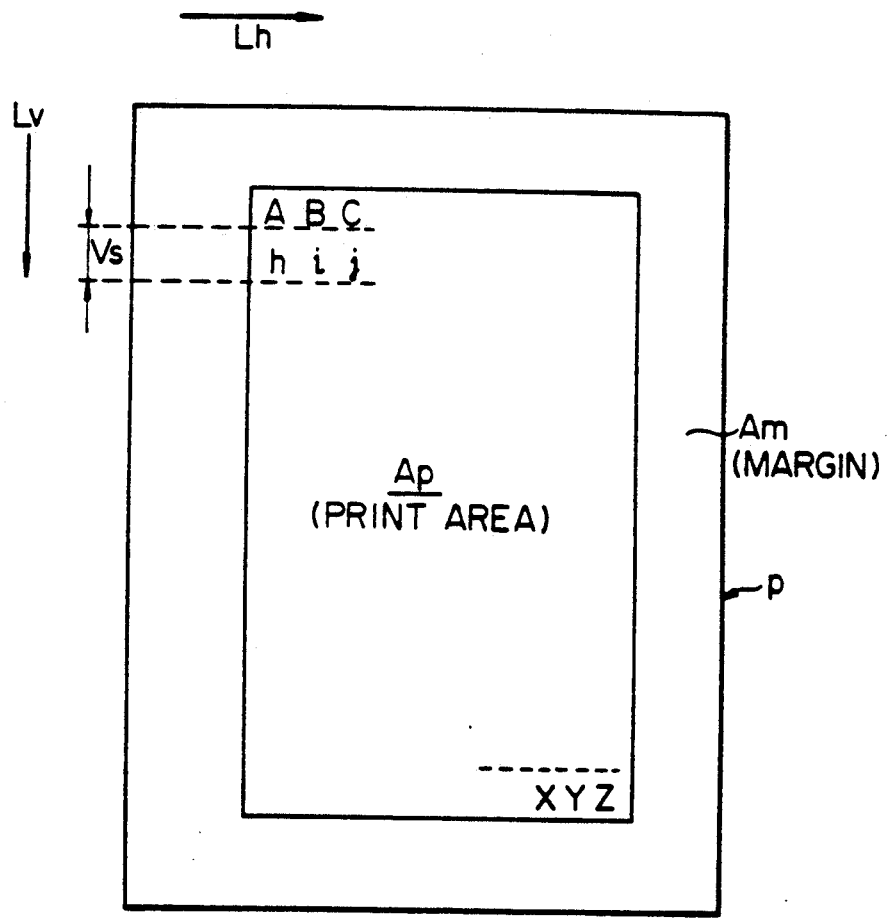
FIG. 12 is a plan view showing the total area of a sheet of paper which may be used as a record medium in a printer apparatus to which the present invention pertains.

FIG. 12 shows the total area of a print sheet P of paper which may be used as a record medium in a printer apparatus 40 to which the present invention pertains. The print sheet P has, within its total area, a print area $A_p$ surrounded by a margin area $A_m$ extending along a pair of parallel longitudinal ends and a pair of parallel lateral ends of the sheet P. When alphanumerical images are to be printed, the images are printed in horizontal lines renewed successively from the uppermost end of the print area $A_p$ downward as indicated by arrow a and each advancing from the leftmost end of the print area $A_p$ rightward as indicated by arrow b. When a change-of-line instruction signal is issued during printing of a line, the print position is moved a predetermined vertical distance $D_s$ from the particular line and, if a return-to-end-of-line instruction signal is then issued, the print position is further moved to the left end of the line to start printing along a new line spaced the distance $D_s$ from the last print line. The sizes of the margin area $A_m$ are determined on the basis of instructions from the data processor unit 30 and may be altered from one page or sheet of paper to another.

The mode of operation of the printer apparatus 40 incorporating the printer control system embodying the present invention thus constructed and arranged will now be described with reference to the flowcharts illustrated in FIGS. 13 to 28 of the drawings. As will have been understood from the foregoing description, the software architecture predominant over the operation of such a printer control system is largely broken down to the following three major categories:

(1) Host process program (144) which (a) reads the data from either the R buffer register 136 or from the user R buffer register 138 of the system RAM unit 124 (FIGS. 7 and 8), (b) analyzes the data received from the R buffer register 136 or the user R buffer register 138, (c) generates data in the form of packets from the data received from the R buffer register 136 or the user R buffer register 138, and (d) stores the data packets into the packet buffer register 138.

(2) Packet process program (146) which (a) analyzes the data packets stored into the packet buffer register 138, (b) controls access to the font memory unit 98 through the font memory interface section 128 to read data from the font memory unit 98 at any of the addresses thereof, (c) transmits data to the bit-map data read/write circuit 100 of the bit-map data processing network 84 through the data write interface section 130 to write data into the bit-map memory unit 96, and (d) transmits data to the interface control circuit 106 of the print engine control network 86 through the print engine interface section 132 to control the paper feed unit implementing the record medium supply unit 44 and the page sorter included in the print output unit 46 of the printer apparatus 40.

(3) User process program (148) which is operative if and when the host protocol Ph dictating the data supplied from the data processor unit 30 differs from the user protocol $P_u$ used in the printer apparatus 40 and which (a) converts such a host protocol $P_h$ dictating the data stored into the R buffer register 136 into a user protocol $P_u$ which can be analyzed by the host process program, and (b) transmits data with the user protocol $P_u$ to the packet buffer register 138 via the user R buffer register 140.

As noted previously, the user process program 148 stored in the font memory unit 98 is useful for processing not only the data supplied from the data processor unit 30 bu so the data read from the font memory unit 98 per se. The host process program 144, packet process program 146 and user process program 148 are accessed successively in accordance with a prescribed order of priority dictated by the scheduler 150 included in the system ROM unit 122. The schedules 150 is responsive to the interrupt signals supplied from the timer circuit 134 to the central processing unit 120. For purposes of description, it is herein assumed that priority is placed on the host, packet and user process programs 144, 146 and 148 in this sequence.

Start Process Program

Figure 13:
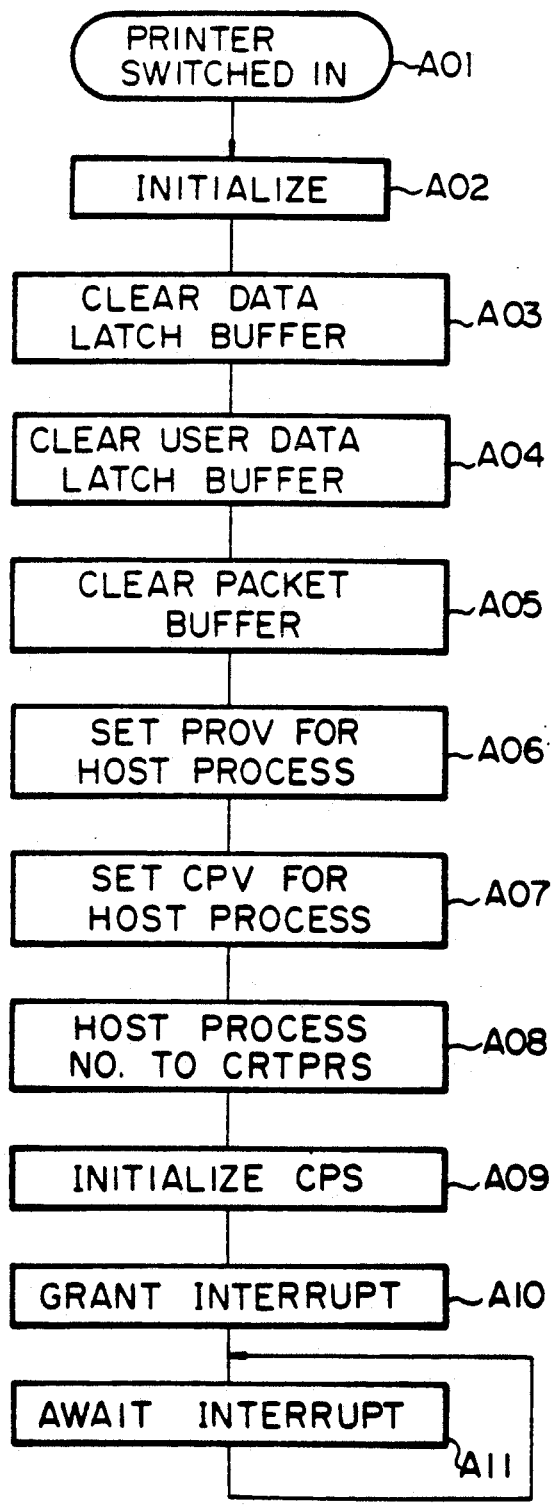
FIG. 13 is a flowchart showing the start process program stored in the system ROM included in the printer control system embodying the present invention.

FIG. 13 shows the start process program 142 stored in that system ROM unit 122 as hereinbefore described with reference to FIG. 9. The start process program 142 is executed to initialize the system central processing unit 120 and the peripheral units when the printer apparatus 40 under consideration is switched in. With the printer apparatus 40 thus switched in, the start process program 142 is started at step A01 so that the system data processor and all the memories, buffers and registers associated with the data processor are initialized at step A02. The R buffer register 136, user R buffer register 140 and packet buffer register 138 (FIG. 8) are also initialized so that the content of each of the buffer registers is cleared, at steps A03, A04 and A05, respectively.

The start process program 142 then proceeds to step A06 at which the flag of a process request vector (PRV) is set for the host process program 144 and further to step A07 at which the flag bit of a current process vector (CPV) is set also for the host process program 144. The start process program 142 further proceeds to step A08 at which the code number represented by a CRTPRS is switched to the number assigned to the host process program 144. The process request vector PRV is such that, when the scheduler 150 of the system ROM unit 122 is activated by timed interrupt from the central processing unit 120, the process request vector PRV informs the scheduler 150 that the request for the execution of the process program interrupted is cancelled and that any process program other than the interrupted program is to be activated in turn. Thus, the process request vector PRV has a flag which may be set for any of the host, packet and user process programs 144, 146 and 148. On the other hand, the current process vector CPV indicates the process program currently under execution and, when the scheduler 150 is activated by timed interrupt from the central processing unit 120, indicates the particular process program which is withdrawn from execution. For the CRTPRS is set numbers which are respectively assigned to the host, packet and user process programs 144, 145 and 146 and which are larger in the order of priority for execution. The CRTPRS indicates the number of the process program indicated by the current flag of the current process vector CPV.

The process request vector PRV, current process vector CPV and CRTPRS being thus set for the host process program 144 at steps A06, A07 and A08, respectively, the scheduler 150 included in the system ROM unit 122 determines the process program to be executed subsequently, viz., the host process program 144 under the current situations. The details of the program to be executed by the scheduler 150 for this purpose will be described later with reference to FIG. 14.

Upon completion of the steps A06, A07 and A08, the start process program 142 proceeds to step A09 to initialize the current process status block CPS of the system RAM unit 124. A starting address is loaded into the memory area of the status block CPS storing the address pointers of the program to be executed by the central processing unit 120 and, in addition, appropriate initial addresses are further loaded into the current process status block CPS such as the memory area of the block storing stack pointers. When the current process status block CPS is thus initialized completely, the request for the timed interrupt is granted at step A10 whereupon the central processing unit 120 waits by way of a loop implemented by step A11 until the timed interrupt is received.

Scheduler Program

Figure 14:
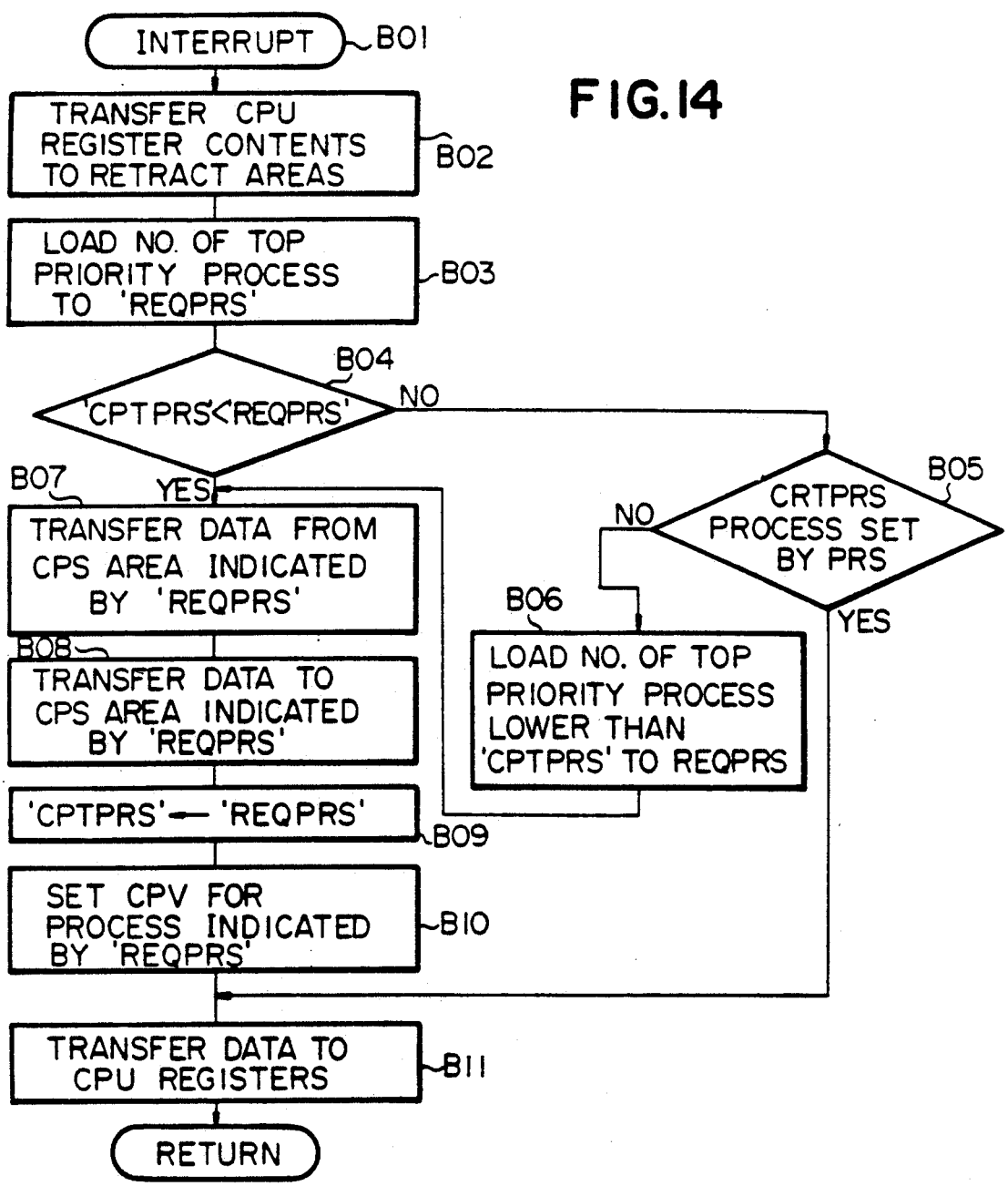
FIG. 14 is a flowchart showing the program stored in the schedular which forms part of the system ROM unit incorporated in the bit-map control circuit illustrated in FIG. 7.

FIG. 14 shows the program stored in the scheduler 150 which forms part of the system ROM unit 122. The scheduler program is started at step B01 responsive to an interrupt signal supplied from the timer circuit 134 to the central processing unit 120. When a request for the timed interrupt is received at step B01, the contents of the registers in the central processing unit 120 are withdrawn into the retract areas of the current process status block CPS. The step B02 is followed by a step B03 at which the top-priority process program is selected out of the process programs represented by the various flags set on the process request vector PRV and the code number assigned to the particular process program is loaded into a rec. In the CRTPRS, the code number assigned to the process program which had been under execution until the timed interrupt was requested is currently saved. Comparison in respect of the order of priority is thus made between this code number and the code number now loaded into the rec and it is tested at step B04 whether or not the process program indicated by the former is lower in the order of priority than the process program indicated by the latter.

If it is found at the step B04 that the process program indicated by the number loaded into the REQPRS is lower in the order of priority than the process program indicated by the number currently saved in the CRTPRS, the answer for the step B04 is given in the negative. In this instance, the scheduler program proceeds to a step B05 at which is confirmed whether or not the process program which had been under execution until the request for the timed interrupt for the process program with the lower order of priority was received has been cancelled with the flag of the process request vector PRV reset. If it is found at this step B05 that the flag of the process request vector PRV still remains valid for the process program which had been under execution, the answer for the step B05 is given in the affirmative. In this instance, the scheduler program proceeds to a step B06 in which the contents of the retract areas of the current process status block CPS are returned to the registers in the central processing unit 120 for completing the remaining portion of the process program which had been under execution until the request for the timed interrupt was received.

If it is found at the step B05 that the flag of the process request vector PRV has been reset so that the process program which had been under execution until the request for the timed interrupt was received has been cancelled, then the answer for the step B05 is given in the negative. In this instance, the scheduler program proceeds to step B06 at which the code number assigned to the process program which is lower in the order of priority than the process program indicated by the code number currently saved in the CRTPRS and which is higher in the order of priority than the remaining process programs is loaded into the REQPRS.

Subsequently to the step B06 or if it is found at the step B04 that the process program indicated by the number currently saved in the CRTPRS is lower in the order of priority than the process program indicated by the number loaded into the REQPRS, the scheduler program proceeds to steps B07 and B08. At the step B07, the content of the retract area of the current process status block CPS storing the process program to be interrupted is transferred to the retract area of the current process status blocks CPS indicated by the code number saved in the CRTPRS and, at the subsequent step B08, the content of the retract area of the current process status block CPS indicated by the code number loaded into the REQPRS is transferred to the retract area of the block CPS from which the process program to be interrupted has been withdrawn.

Subsequently to the step B08, the code number for the process program now indicated by the rec is loaded into the CRTPRS at a step B09, whereupon the flag of the current process vector CPV is set for the process program indicated by the REQPRS at a step B10. The content of the retract area of the current process status block CPS now storing the process program indicated by the code number indicated by the REQPRS is transferred from the block CPS to the registers in the central processing unit 120 for starting the execution of the newly requested process program.

Host Process Program

Figure 15B:
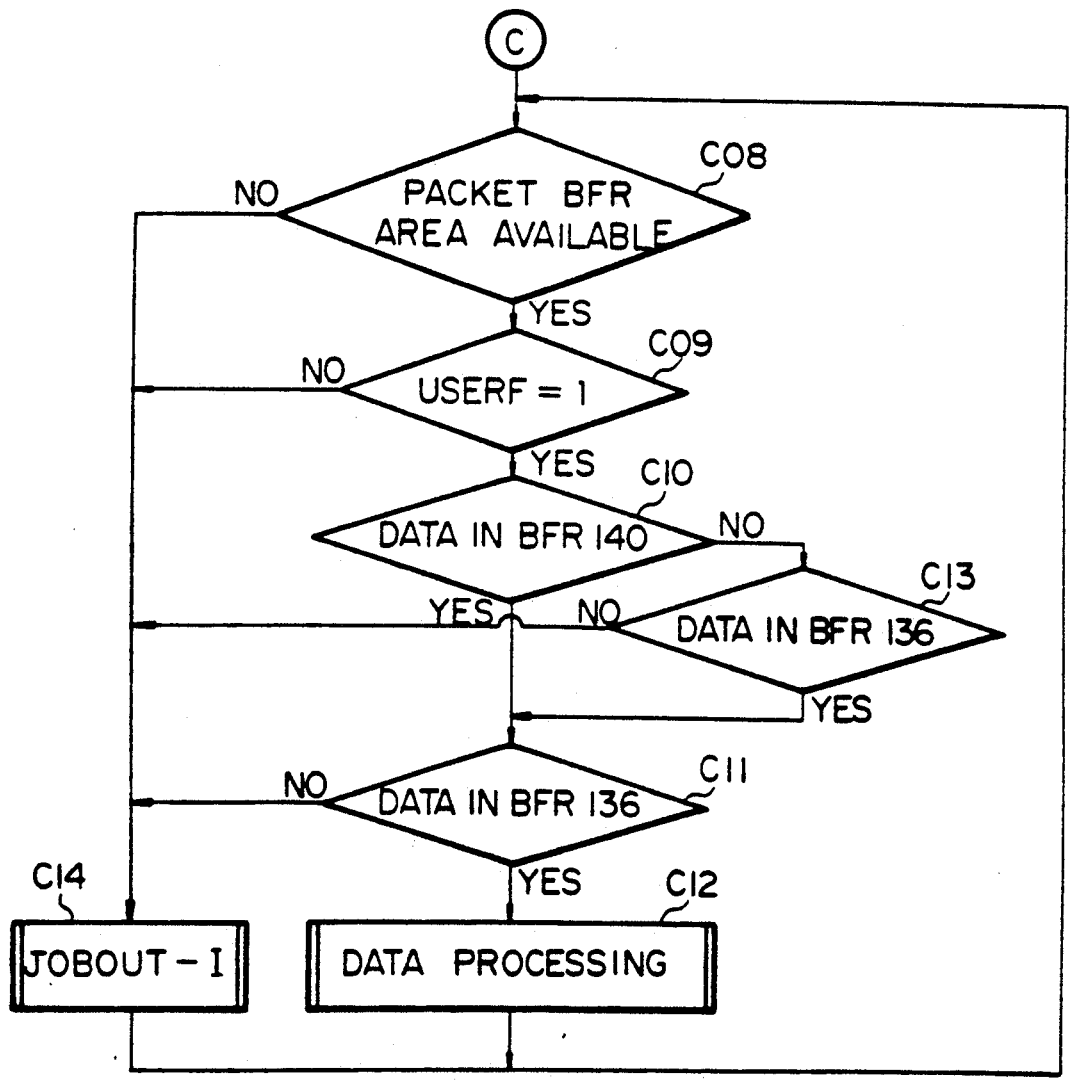
Figure 16:
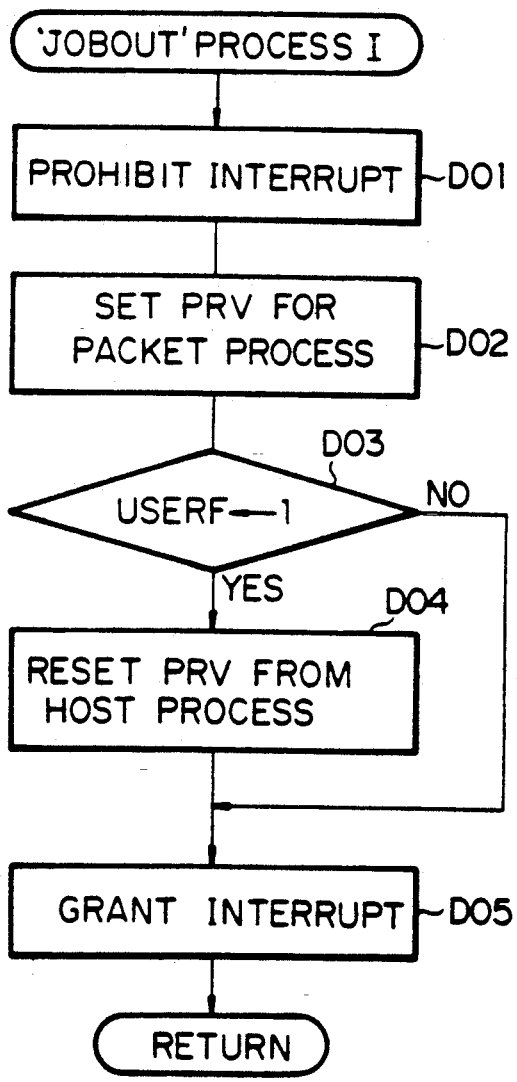
FIG. 16 is a flowchart showing the details of the JOBOUT-I ss included in the host process program shown in the flowcharts of FIGS. 15A and 15B.

FIGS. 15A and 15B show the host process program 144 stored in the system ROM unit 122. As previously noted, the host process program 144 is executed to read data from either the R buffer register 136 or from the user R buffer register 138 of the system RAM unit 124 (FIGS. 7 and 8), analyze the data received from the R or user R buffer register 136 or 138, generate data in the form of packets from the data received, and store the data packets into the packet buffer register 138.

As will be understood from the foregoing description, such a host process program 144 is started when the scheduler 150 is requested by timed interrupt from the central processing unit 120 to activate the program 144 with flag of the process request vector PRV reset for the host process program 144 through execution of the scheduler program hereinbefore described. The scheduler 150 being thus requested to activate the host process program 144 with the flag of the process request vector PRV thus reset for the program 144, the starting address for the host process program 144 is applied to the program counter within the central processing unit 120.

When the host process program 144 is thus activated, all the flags used for the program 144 are initialized at a step C01 shown in FIG. 15A. For example, a flag USERF representative of the status of the user process program 148 may be set to logic "0" state to indicate that the user process program 148 is not or not to be under execution. At the step C01, a flag LPWRITE representative of the status of the data processing program (to be described later with reference to FIGS. 17A and 17B) is also set to logic "0" state to indicate that a provisional image is being edited. Subsequently to the initializing step C01, the font memorized in the font memory unit 98 is read out to check for the attributes of the font available and thereafter it is tested at a step C03 whether or not the user process program 148 is incorporated within the font memory unit 98. When it is confirmed at this step C03 that the user process program 148 is incorporated within the font memory unit 98, then at a step C04 the user process program 148 is loaded from the font memory unit 98 into the previously mentioned segment of the system RAM unit 124 (FIG. 7). When it is then confirmed at a step C05 that the user process program 148 has been completely loaded into the system RAM unit 124, the flag USERF representative of the status of the user process program 148 is at a step C06 shifted to logic "1" state for execution of the user process program 148. Then at a step C07 the flag of the process request vector PRV is set for the user process program 148. These steps C03 to C06 are required to maintain the process request vector PRV biased to the process program with the lowest order of priority (which program is herein assumed to be the user process program) so that a request for the execution of the particular process program may not be unconditionally cancelled.

Upon termination of the step C07 or when it is found at the step C03 that the font memory unit 98 has no user process program incorporated therein, the host process program 144 proceeds through a connector C to the major process loop illustrated in FIG. 15B.

Initially in the major process loop shown in FIG. 15B, it is tested at step C08 whether or not the packet buffer register 138 has a memory area available and, if it is found that this is the case, it is further queried at step C09 whether or not the flag USERF is of the logic "1" state indicating that the user process program 148 is to be executed. When the answer for the step C09 is given in the affirmative, it is confirmed at step CIO whether or not there is data stored in the user R buffer register 140 of the system RAM unit 124 and, if it is found that there is data in the user R buffer register 140, it is confirmed at step C11 there is data stored in the R buffer register 136 of the system RAM unit 124. When it is found that there is data stored in the R buffer register 136, the host process program 144 proceeds to a data processing subroutine C12. Thus, the data processing subroutine C12 is executed when the packet buffer register 138 has a memory area available, the flag USERF indicates that the user process program 148 is to be executed, and there is data stored in each of the R and user R buffer registers 136 and 140 of the system RAM unit 124. If it is found at step C10 that there is data stored in the user R buffer register 140 of the system RAM unit 124 it is also questioned at step C13 whether or not there is a data stored in the R buffer register 136. If the answer for this step C14 is given in the affirmative, the step C13 is followed through the step C11 by the subroutine C12. Thus, the data processing subroutine C12 is also executed when the packet buffer register 138 has a memory area available and there is data stored in the R buffer register 136 if the flag USERF indicates that the user process program 148 is not to be executed. Details of the data processing subroutine C12 will be described later (with reference to FIGS. 17A and 17B).

When the answer for any one of the steps C08, C09, C11 and C13 is given in the negative, the host process program 144 proceeds to a JOBOUT-I process subroutine C14. Details of this JOBOUT-I process subroutine C14 are shown in the flow-chart of FIG. 16 and 17B.

JOBOUT-I Process Routine

The JOBOUT-I process subroutine C14 is executed to update the flag of the process request vector PRV to request the scheduler 150 to make a shift to a process program with a higher order of priority (which process program is in this instance assumed to be the packet process program 146) during execution of the host process program 144.

Such a JOBOUT-I process subroutine C14 starts with a step D01 to prohibit the timed interrupt from the central processing unit 120 and then proceeds to a step D02 at which the process request vector PRV is set for the packet process program 146, whereupon it is confirmed at a step D03 whether or not the flag USERF is of the logic "1" state. If it is found at this step D03 that the flag USERF is of the logic "1" state indicating that the user process program 148 is to be executed, the step D03 is followed by a step D04 at which the flag of the process request vector PRV set for the host process program 144 is reset. This is because of the fact that the host process program 144 is not the process program with the lowest order of priority and thus abandons the right to be executed. Subsequently to this step D04 or when it is confirmed at the step D03 that the flag USERF is of the logic "0" state indicating that the user process program 148 is not to be executed, the flag of the process request vector PRV set for the host process program 144 is maintained because, in this instance, it is determined that the host process program 144 is the process program with the lowest order of priority. The prohibition of the timed interrupt is then cancelled at step D05 and then the host process program 144 reverts to the step C01 of the routine program.

As will be understood from the above description, the JOBOUT-1 process subroutine is executed when the packet buffer register 138 has no memory area available or there is no data stored in at least one of the R and user R buffer registers 136 and 140 of the system RAM unit 124 (or under other conditions in the data processing subroutine C12). If the scheduler 150 of the system ROM unit 122 is activated responsive to a request for timed interrupt during execution of the host process program 144, the host process program 144 reverts to its initial step through the JOBOUT-I process subroutine C14 unless and until the flag of the process request vector PRV set for the host process program 144 is reset. The data processing subroutine C12 can thus be performed repeatedly during execution of the host process program 144.

Data Processing Subroutine

In order that the data received be processed, the data must be released from the data latch buffer register into which the data has been stored. In the printer control system embodying the present invention, the data supplied from the data processor unit 30 with the host protocol $P_h$ is initially loaded through the data input interface section 118 into the R buffer register 136 of the system RAM unit 124 (under the control of the central processing unit 120 executing the data loading interrupt subroutine to be described with reference to FIG. 20). When execution of the user process program 148 is requested with the flag USERF set at the logic "1" state, the data thus stored into the R buffer register 136 is transferred to the user R buffer register 140 with the host protocol $P_h$ converted into the user protocol $P_u$ through execution of the user process program 148 read out from the system RAM unit 124. Accordingly, the data to be processed by the host process program 144 is supplied directly from the R buffer register 136 when the flag USERF is of the logic "0" state and from the user R buffer register 140 when the flag USERF is of the logic "1" state.

Thus, the data processing subroutine C12 starts with a decision step E01 to check if the flag USERF is of the logic "1" state. If it is found at this step E01 that the flag USERF is of the logic "1" state, the central processing unit 120 reads data from the user R buffer register 140 as at step E02 and, if it is found that the flag USERF is of the logic "0" state, then the central processing unit 120 reads data from the R buffer register 136 as at step E03.

In the meantime, the data supplied from the data processor unit 30 may include any one or ones of the following five major types of information:

(a) coded print engine control data predominant over the operation of the print engine 42, this type of data being processed through steps E04 to E06, (b) coded job control data, which is processed through steps E07 to E11, (c) format control data predominant over the format in accordance with which prints are to be produced, which type of data is to be processed through steps E12 and E13, (d) image data consisting of coded alphanumerical and graphic information, which is processed through steps E27 to E33, and (e) user process control data to control the execution of the user process program 148, this type of data being processed through steps E17 to E21.

The job control data in particular include a coded PAGE EJECT signal to be used for pagination of printed outputs and a coded JOB START signal to be used for the grouping of pages.

For the processing of these different types of data, the data processing C12 proceeds from the step E02 or the step E03 to a decision step E04 at which is confirmed whether or not the data received from the R buffer register 136 or the user R buffer register 140 includes the coded print engine control data to be predominant over the operation of the print engine 42. If it is found at the step E04 that such control data is included in the data received, the control data is output to the packet buffer register 138 for transmission to the interface control circuit 106 of the print engine control network 86 through the control data but B4 (FIG. 6). In order that the data is to be input to the interface control circuit 106 in synchronism with the image data to be input to the print head control circuit 110 of the print engine control network 86 through the image data but B, the print engine control data is supplied in the form of function-type intermediate code signals to the package buffer register 138. After the engine control data is thus input to the packet buffer register 138, the central processing unit 120 executes the JOBOUT-I process subroutine as at step E06 and, upon termination of the subroutine, reverts to the step E01.

After the print engine control data is thus transferred to the packet buffer register 138, the answer for the decision step E04 turns negative. It is thus confirmed at step E07 whether or not the data received from the buffer register 136 or 140 includes the JOB START signal to be predominant over the grouping of pages. If it is found at the step E07 that the JOB START signal is contained in the data received, the signal is output to the packet buffer register 138 at step E08 for transmission to the interface control circuit 106 of the print engine control network 86. In this instance, the JOB START signal is also supplied in the form of function-type intermediate code signals to the package buffer register 138 for the reason above explained.

If it is found at the step E07 that the JOB START signal is not or no longer included in the data received, the step E07 is followed by a decision step E09 to confirm whether or not the data received from the buffer register 136 or 140 includes the PAGE EJECT signal to be predominant over the pagination of the printed output. If it is found at the step E09 that the PAGE EJECT signal is contained in the data received, the signal is processed in accordance with a PAGE EJECT subroutine E10 as will be described with reference to FIG. 18 and thereafter further with the JOBOUT-I process subroutine as at step E11. Upon termination of the JOBOUT-I process subroutine at the step E11, the central processing unit 120 reverts to the step E01.

If it is found at the step E09 that the PAGE EJECT signal is not or no longer included in the data received, the step E09 is followed by a decision step E12 to confirm whether or not the data received from the buffer register 136 or 140 includes the format control data predominant over the format in accordance with which a printed output is to be produced. In the presence of such a control data, the step E12 is followed by a format control subroutine E13 the details of which will be described with reference to FIG. 19. Upon termination of the format control subroutine at the step E13, the central processing unit 120 reverts to the step E01.

If the data supplied from the data processor unit 30 may include a signal indicating the number of the printed outputs to be produced for the same original image, it may be tested at a step E14 whether or not such a signal is included in the data received from the buffer register 138 or 140. If it is found at this step E14 that there is such a signal contained in the data received, the signal is output to the packet buffer register 138 as at step E15 for transmission to the interface control circuit 106 of the print engine control network 86. In this instance, the signal is also supplied in the form of function-type intermediate code signals to the package buffer register 138, whereupon the central processing unit 120 reverts to the step E01. If it is determined at the step E14 that the signal indicating the number of the printed outputs is not included in the data received, the data processing subroutine proceeds through a connector E to a decision step E16 shown in FIG. 17B.

At this decision step E16 is queried whether or not the data received from the buffer register 136 or 140 includes a coded signal requesting the loading of the user process program 148 from the font memory unit 98. If it is found that there is such a signal contained in the data received, the step E16 is followed by a step E17 to confirm whether or not the flag USERF is of the logic "0" state. When it is found at this step E17 that the flag USERF is of the logic "1" state indicating that the user process program 148 is currently under execution, the central processing unit 120 reverts to the step E01. If, however, it is found at the step E17 that the flag USERF is of the logic "0" state indicating that the user process program 148 is currently not in use, the step E17 is followed by a step E18 at which the user process program 148 is loaded from the font memory unit 98 into the previously mentioned download segment of the system RAM 124 (FIG. 10A). When the loading of the user process program 148 is complete as confirmed at step E19, the flag USERF is shifted to the logic "1" state to indicate that the user process program 148 is in use and, thereafter, the flag of the process request vector PRV is get for the user process program 148 as at step E21. Subsequently to the step E21, the central processing unit 120 reverts to the step E01.

If it is found at the step E16 that the data received from the buffer register 136 or 140 is devoid of the coded signal requesting the loading of the user process 148, the step E16 is followed by a step E22 to confirm whether or not the data received includes a coded signal requesting cancellation of the request for the execution of the user process program 148. If it is found at the step E22 that there is such a signal included in the data received, the flag USERF is shifted to the logic "0" state to indicate that the user process program 148 is not to be executed and, thereafter, the flag of the process request vector PRV which has been set for the user process program 148 is reset at step E24. Subsequently to the step E24, the central processing unit 120 reverts to the step E01.

If it is found at the step E22 that the signal requesting cancellation of the request for the execution of the user process program 148 is not included in the data received, it is queried at step E25 whether or not the previously noted flag LPWRITE representative of the status of the data processing program is of the logic "0" state. If it found at this step E25 that the flag LPWRITE currently has the logic "1" state or after the flag LPWRITE is shifted to the logic "1" state at step E26 with the flag found to be of the logic "0" state at st(hp E25, it is tested at step E27 whether or not the data received includes data representative of letter or alphanumerical images. If it is found at this step E27 that such alphanumerical image data is included in the data received, the data is input to the packet buffer register 138 at steps E28, E29, and E30 upon conversion into function-type intermediate code signals similar in format to the command signal supplied to the font data read/write control circuit 156 (FIG. 11). The data thus input to the packet buffer register 138 include addresses at which font data is to be read from the font memory unit 98 (step E28), addresses at which data is to be loaded into the bit-map RAM unit 96 of the data processing network 84 shown in FIG. 6 (step E29), and an instruction for the data write mode are input to the packet buffer register 138 (step E30). The addresses at which data is to be loaded into the bit-map RAM unit 96 correspond to prescribed locations in the print area $A_p$ within the print sheet P shown in FIG. 12. Subsequently to the steps E28, E29, and E30, the print position at which an image is to be subsequently printed on the print area $A_p$ of the print sheet P (FIG. 12) are updated at step E31 and, thereupon, the central processing unit 120 reverts to the step E01.

If it is found at the step E27 that alphanumerical data is not or no longer included in the data received, the step E27 is followed by a step E32 at which is tested whether or not the data received includes data representative of graphic images. If it is found at this step E32 that such graphic image data is included in the data received, the data is input to the packet buffer register 138 at step E33. The data to be input to the packet buffer register 138 is also converted into function-type intermediate code signals similar in format to the command signal supplied to the graphic data read/write control circuit 154. Subsequently to the step E33, the central processing unit 120 reverts to the step E01.

PAGE EJECT Subroutine

Referring to FIG. 18, the PAGE EJECT subroutine E10 included in the data processing subroutine hereinbefore described is executed as a virtual processing subroutine by means of which the PAGE EJECT signal is edited provisionally into the form of packets as the function-type intermediate code signals before the signal is transmitted from the R buffer register 136 to the packet buffer register 138.

The PAGE EJECT subroutine E10 is executed subsequently to the step E09 of the data processing subroutine described with reference to FIGS. 17A and 17B. When it is found at the step E09 of the data processing subroutine that the PAGE EJECT signal is contained in the data received from the R buffer register 136 or user R buffer register 140, it is tested at step F01 whether or not the flag LPWRITE representative of the status of the data processing program is of the logic "1" state. If it found at this step F01 that the flag LPWRITE currently has the logic "1" state, the PAGE EJECT signal is transmitted from the R buffer register 136 or the user R buffer register to the packet buffer register 138 at step F02. Before the signal is thus transmitted to the packet buffer register 138, the signal is converted into the form of a packet as the function-type intermediate code signal. It may be herein noted that, at the point of time the intermediate code signal is thus received by the packet buffer register 138, the print sheet on which images have been printed completely is discharged through the print output unit 46 of the printer apparatus 40 shown in FIG. 3.

The step F02 is followed by a step F03 at which the print position at which an image is to be printed on the print area $A_p$ of the subsequently supplied print sheet is moved to the start position of the print area $A_p$ (FIG. 12) and, thereupon, the flag LPWRITE is shifted to the logic "0" state at step F04. Subsequently to the step F04 or when it found at the step F01 that the flag LPWRITE has the logic "0" state, the central processing unit 120 reverts to the step F01 or proceeds to the JOBOUT-I process subroutine as at the step E11 shown in FIG. 17A.

Format Control Subroutine

Figure 17A:
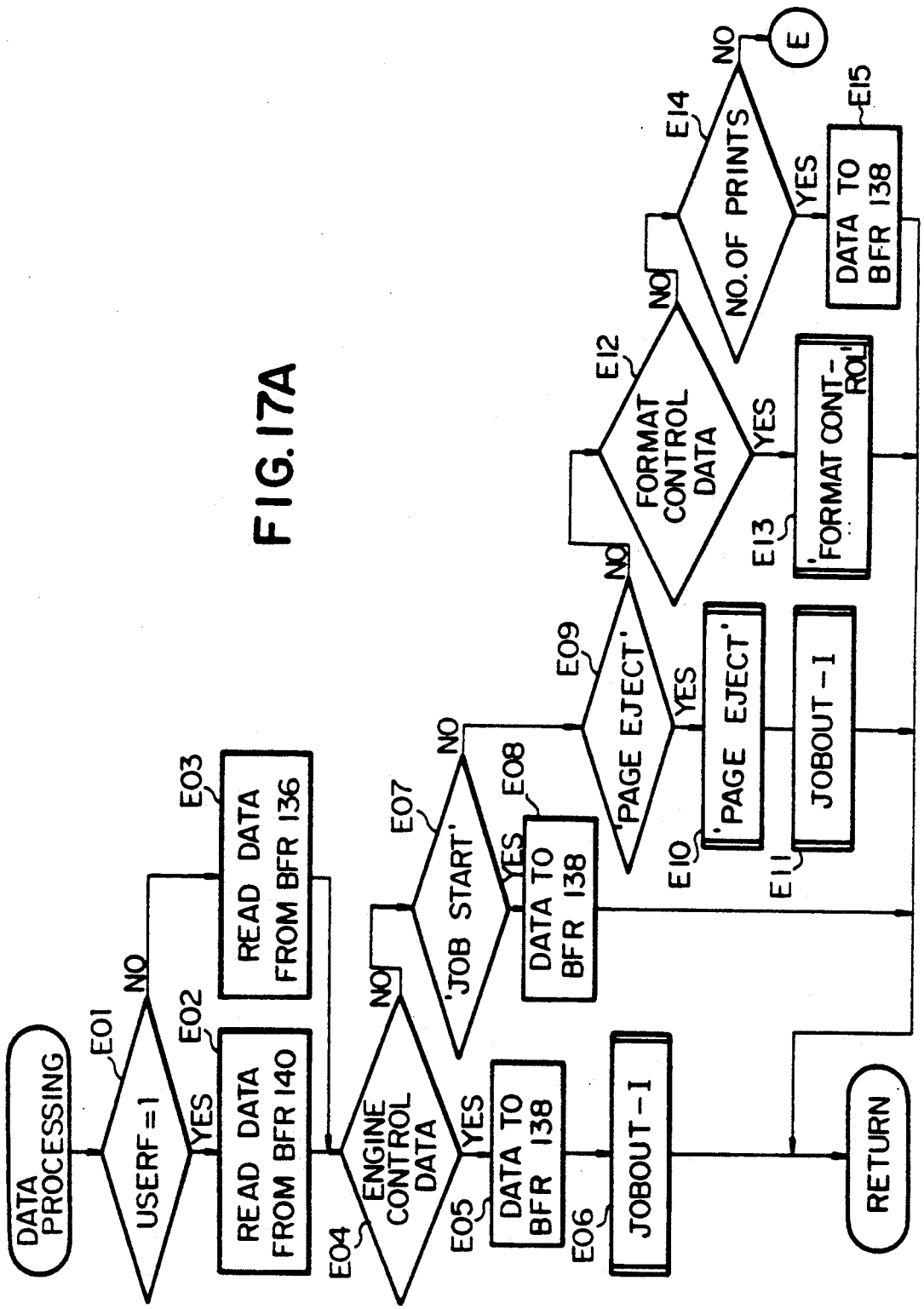
FIGS. 17A and 17B are flowcharts showing the details of the data processing subroutine also included in the host process program shown in the flowcharts of FIGS. 15A and 15B.
Figure 17B:
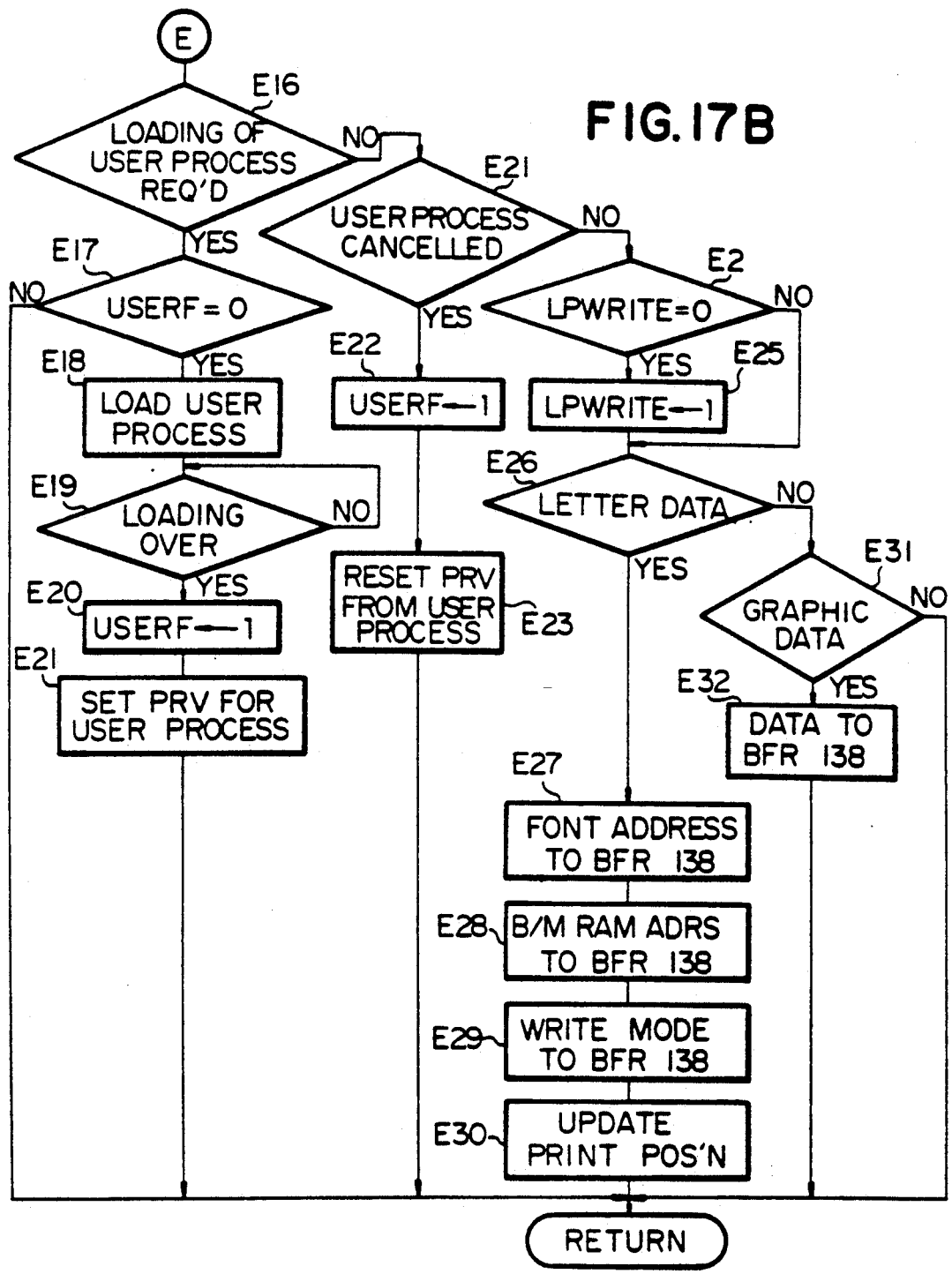

Turning to FIG. 19, the format control subroutine E13 included in the data processing subroutine described with reference to FIGS. 17A and 17B is started in response to the previously mentioned change-of-line instruction signal $S_{CL}$ or return-to-end-of-line instruction signal $S_{RE}$ which may be issued during printing of a line within the print area $A_p$ of a print sheet. Thus, when it is confirmed at step G01 that the return-to-end-of-line instruction signal $S_{RE}$ is included in the data received from the buffer register 136 or 140, the print position is moved to the left end of the line as at step G02 to re-start printing from the left end of the print area $A_p$. If it is found at the step G01 that the return-to-end-of-line instruction signal $S_{RE}$ is not included in the data currently received, the step G01 is followed by a step G03 at which it is checked whether or not the change-of-line instruction signal $S_{CL}$ is included in the data received. If it is confirmed at the step G03 that the change-of-line instruction signal $S_{CL}$, the print position is moved a predetermined vertical distance $D_s$ from the last print line at step G04.

Besides these change-of-line and return-to-end-of-line instruction signals $S_{CL}$ and $S_{RE}$, a random print position request signal $S_{RP}$ may be included in the data received from the buffer register 136 or 140. When it is found at the step G03 that the change-of-line instruction signal $S_{CL}$ is not included in the data currently received, the step G03 is followed by a step G05 at which it is queried whether or not there is the random print position request signal $S_{RP}$ included in the data received. If it is found at the step G05 that there is such a signal $S_{RP}$ included in the data received, an updated print position is calculated at step G06 with an appropriate offset value added to the current print position so that an image is to be subsequently printed at the updated print position within the print area $A_p$ of the print sheet P.

Subsequently to the step G02, G04 or G06 or when it found at the step G05 that the random print position request signal $S_{RP}$ is not included in the data received, the central processing unit 120 reverts to the step G01 or to the step E01 of the data processing subroutine shown in FIGS. 17A and 17B.

Data Loading Interrupt Subroutine

In FIG. 20 is shown the flowchart of the data loading interrupt subroutine which controls the loading of data through the data input interface section 118 into the R buffer register 136 of the system RAM unit 124 (FIG. 8). Thus, the data loading interrupt subroutine includes a step H01 at which data is supplied from the data processor unit 30 is transferred to the data input interface section 118 of the system RAM unit 124. At a subsequent step H02, the data thus loaded into the into the data input interface section 118 is then loaded into the R buffer register 136 of the system RAM unit 124.

Packet Process Program

As noted previously, the packet process program 146 is executed to analyze the data packets stored into the packet buffer register 138, control access to the font memory unit 98 to read data from the memory unit 98, transmit data to the bit-map data read/write circuit 100 to write data into the bit-map memory unit 96, and transmit data to the interface control circuit 106 to control the record medium supply unit 44 and the page sorter included in the print output unit 46 of the printer apparatus 40.

Figure 21A:
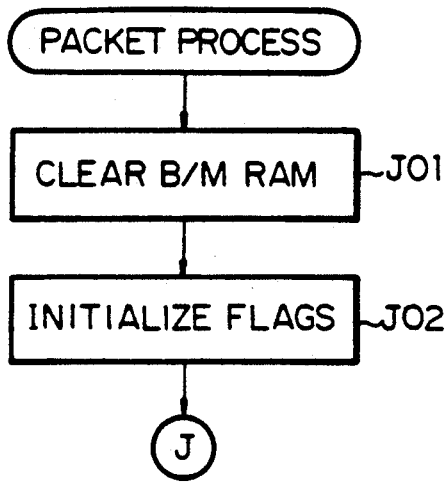
FIGS. 21A and 21B are flowcharts showing the details of the packet process program also stored in the system ROM unit.

Referring to FIG. 21A, the central processing unit 120 starts execution of the packet process program 146 with the printer apparatus 40 switched in and first proceeds to step J01 to clear the image data area of the bit-map RAM unit 96 of the bit-map data processing network 84 (FIG. 6). Subsequently to the step J01, the control flags predominant over the packet process program 146 are initialized each to a logic "1" state. These control flags include a flag JOBACT indicative of a particular state of the printer apparatus 40, a flag BMWRITE to request loading of data into the bit-map RAM unit 96, a flag COPY indicating the desired total number of the print sheets to be output for the same original image, a flag CCOUNT indicating the current number of the print sheets to be output in addition to the print sheet or sheets already output for the same original image. The flag CCOUNT is to be decremented each time a print sheet is output for the same original image. The flag JOBACT of a logoc "1" state is indicative of the state of the printer apparatus 40 allowing a print sheet to be discharged through the print output unit 46.

Figure 21B:
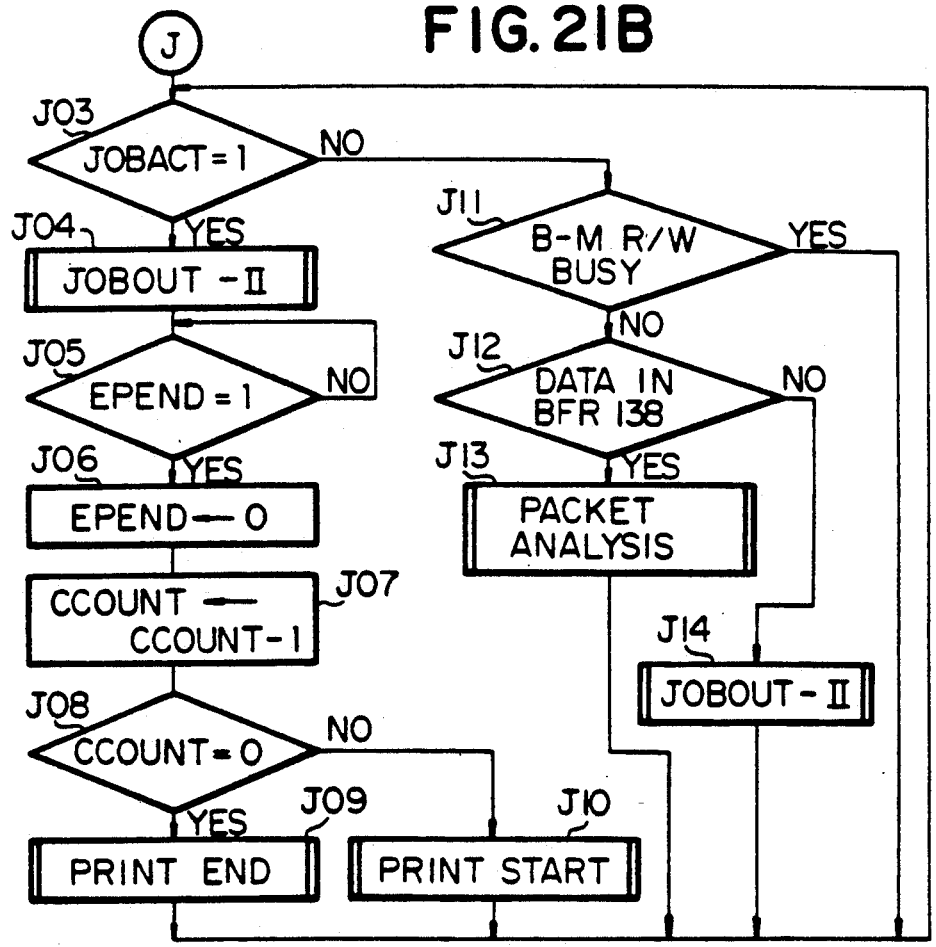

The packet process program 146 then proceeds through a connector J to the major process loop illustrated in FIG. 21B. Initially in the major process loop shown in FIG. 21B, it is tested at step J03 whether or not the flag JOBACT has the logic "1" state. If the answer for this step J03 is given in the affirmative allowing a print sheet is to be discharged from the printer apparatus 40, the central processing unit 120 executes a sequence of print control steps starting with a JOBOUT-II process subroutine J04. The details of this JOBOUT-II process subroutine J04 will be hereinafter described with reference to FIG. 22. Upon termination of the JOBOUT-II process subroutine J04, it is tested at a step J05 whether or not a flag EPEND is of a logic "1" state. This flag EPEND is set or reset responsive to an interrupt command EXPEND to terminate the optical scanning of the original image and is set to the logic "1" state in response to the command EXPEND. The details of the EXPEND interrupt subroutine will be described hereinafter with reference to FIG. 26.

When it is found at the step J05 that the flag EPEND has the logic "1" state, the flag EPEND is shifted to a logic "0" state at a subsequent step J06 and further at a step J07 the flag CCOUNT is decremented with a print sheet output for the same original image and discharged from the apparatus 40. The step J07 is followed by a step J08 at which is queried whether or not the flag CCOUNT indicating the current number of the print sheets which remain to be output has reached zero, viz., all the desired number of print sheets have been output for the same original image. When the answer for the step J08 is given in the affirmative, the current cycle of printing operation is terminated through execution of a print end subroutine J09 and, if the answer for the step J08 is given in the negative, the subsequent cycle of printing operation is started through execution of a print start subroutine J10. The details of these print end and start subroutines J09 and J10 will be hereinafter described with reference to FIGS. 23 and 24, respectively.

When it is found at the step J03 whether or not the flag JOBACT has the logic "0" state, it is further tested at step J11 whether or not the bit-map read/write circuit 100 is currently in operation. If it is found at this step J11 that the bit-map read/write circuit 100 is busy, the step J11 is followed by a step J12 at which is queried whether or not there currently is data stored in the form of packets or function-type intermediate code signals within the packet buffer register 138. If it is determined at the step J12 that such data is stored in the packet buffer register 138, the central processing unit 120 reads the packet data stored in the packet buffer register 138 and analyzes the data through execution of a data analysis subroutine J13. The details of this data analysis subroutine J13 will be hereinafter described with reference to FIGS. 25A and 25B.

When it is found at the step J12 that data in the form of packets is stored in the packet buffer register 138, the central processing unit 120 proceeds to the JOBOUT-II process subroutine as at a step J14. Upon termination of the print end subroutine J09 or the print start subroutine J10, the packet analysis subroutine J13, or the JOBOUT-II process subroutine at step J14, the central processing unit 120 reverts to the step J03 to repeat the process loop as hereinbefore described with reference to FIG. 21B.

JOBOUT-II Process Subroutine

Figure 22:
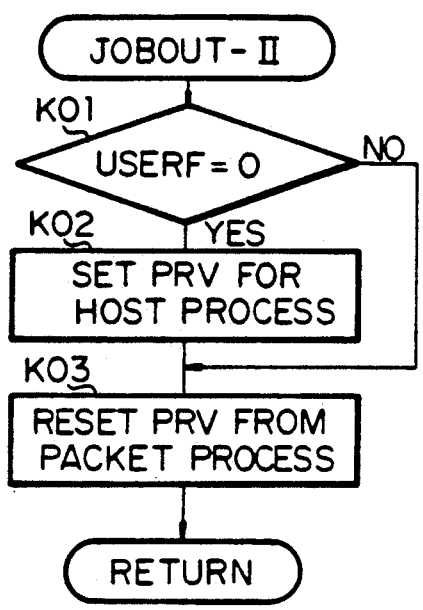
FIG. 22 is a flowchart showing the details of the JOBOUT-II subroutine included in the packet process program shown in the flowcharts of FIGS. 21A and 21B.

FIG. 22 is a flowchart showing the details of the JOBOUT-II process subroutine included in the packet process program hereinbefore described. The JOBOUT-II process subroutine is executed as the step J04 to start the sequence of print control steps or when it is found that data is no longer stored in the packet buffer register 138 as confirmed at the step J12 in the packet process program.

Such a JOBOUT-II process subroutine J04 starts with a decision step K01 to confirm whether or not the flag USERF has the logic "0" state. If it is found at this step K01 that the flag USERF is of the logic "0" state, the flag of the process request vector PRV is set for the host process program 144 as at step K02. Subsequently to this step K02 or when it is found at the step K01 that the flag USERF is of the logic "1" state, then the flag of the process request vector PRV set for the packet process program 146 is reset at step K03. Thus, the packet process program 146 having the highest order of priority is cancelled by the process request vector PRV through execution of the JOBOUT-II process subroutine so that the scheduler 150 is enabled to allow execution of the process program with the lowest pruority prder.

The JOBOUT-II process subroutine thus executed is followed by the step J05 to query whether or not the flag EPEND is of the logic "1" state or by the step J03 to repeat the process loop of the packet process program described with reference to FIGS. 21A and 21B.

Print End Subroutine

Figure 23:
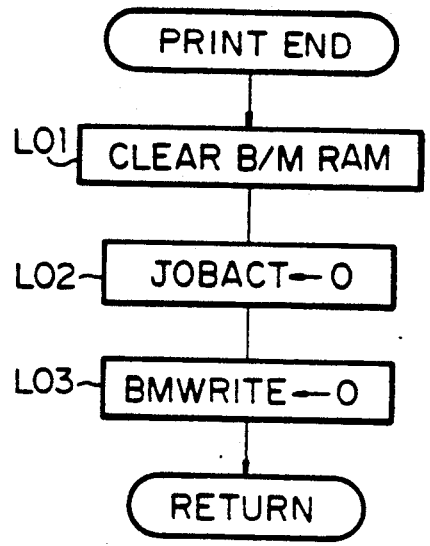
FIG. 23 is a flowchart showing the details of the print end subroutine also included in the packet process program shown in the flowcharts of FIGS. 21A and 21B.

FIG. 23 is a flowchart showing the details of the print end subroutine J09 also included in the packet process program described with reference to FIGS. 21A and 21B.

The print end subroutine J09 is executed when it is determined at the step J08 of the packet process program that all the desired number of print sheets have been output for the same original image and starts with a step L01 to clear the content of the bit-map RAM unit 96 at step L01 to enable the RAM unit 96 to accept data in the subsequent cycle of operation. The step L01 is followed by a step L02 at which the flag JOBACT is shifted to logic "0" state to clear the state of the printer apparatus 40 allowing a print sheet to be discharged through the print output unit 46. Subsequently, the flag BMWRITE to request loading of data into the bit-map RAM unit 96 is shifted to logic "0" state at step L03.

The print end subroutine thus executed is followed by the step J03 to repeat the process loop of the packet process program described with reference to FIGS. 21A and 21B.

Print Start Subroutine

Figure 24:
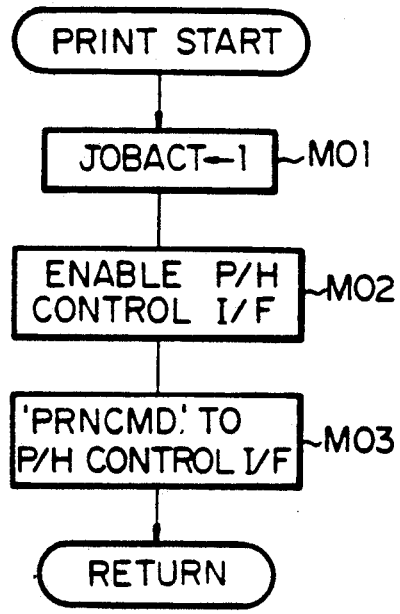
FIG. 24 is a flowchart showing the details of the print start subroutine further included in the packet process program shown in the flowcharts of FIGS. 21A and 21B.

FIG. 24 is a flowchart showing the details of the print start subroutine further included in the packet process program described with reference to FIGS. 21A and 21B.

The print start subroutine J10 is executed when it is determined at the step J08 of the packet process program that all the desired number of print sheets have not been output for the same original image. The subroutine J10 starts with a step M01 at which the flag JOBACT is shifted to logic "1" state indicating the state of the printer apparatus 40 allowing a print sheet to be discharged through the print output unit 46. The step M01 is followed by a step M02 at which an instruction signal is issued from the central processing unit 120 to enable the print head control interface circuit 160 (FIG. 11), whereupon at step M03 a print command signal PRNCM is input to the interface control circuit 106 of the print engine control network 86 (FIG. 6). Accordingly, the print head control interface circuit 160 is enabled to transmit data from the bit-map RAM 96 to the print head control circuit 110 through the image data bus B4.

Figure 26:
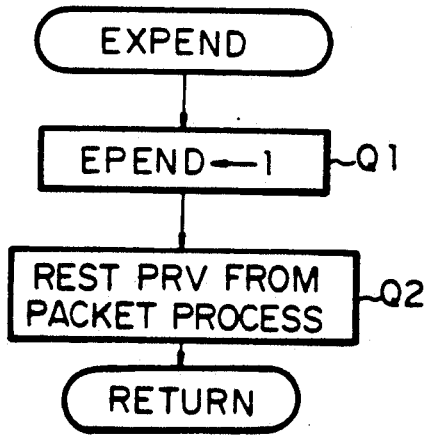
FIG. 26 is a flowchart showing the details of the EXPEND interrupt subroutine to be used in the packet process program shown in the flowcharts of FIGS. 21A and 21B.
Figure 27:
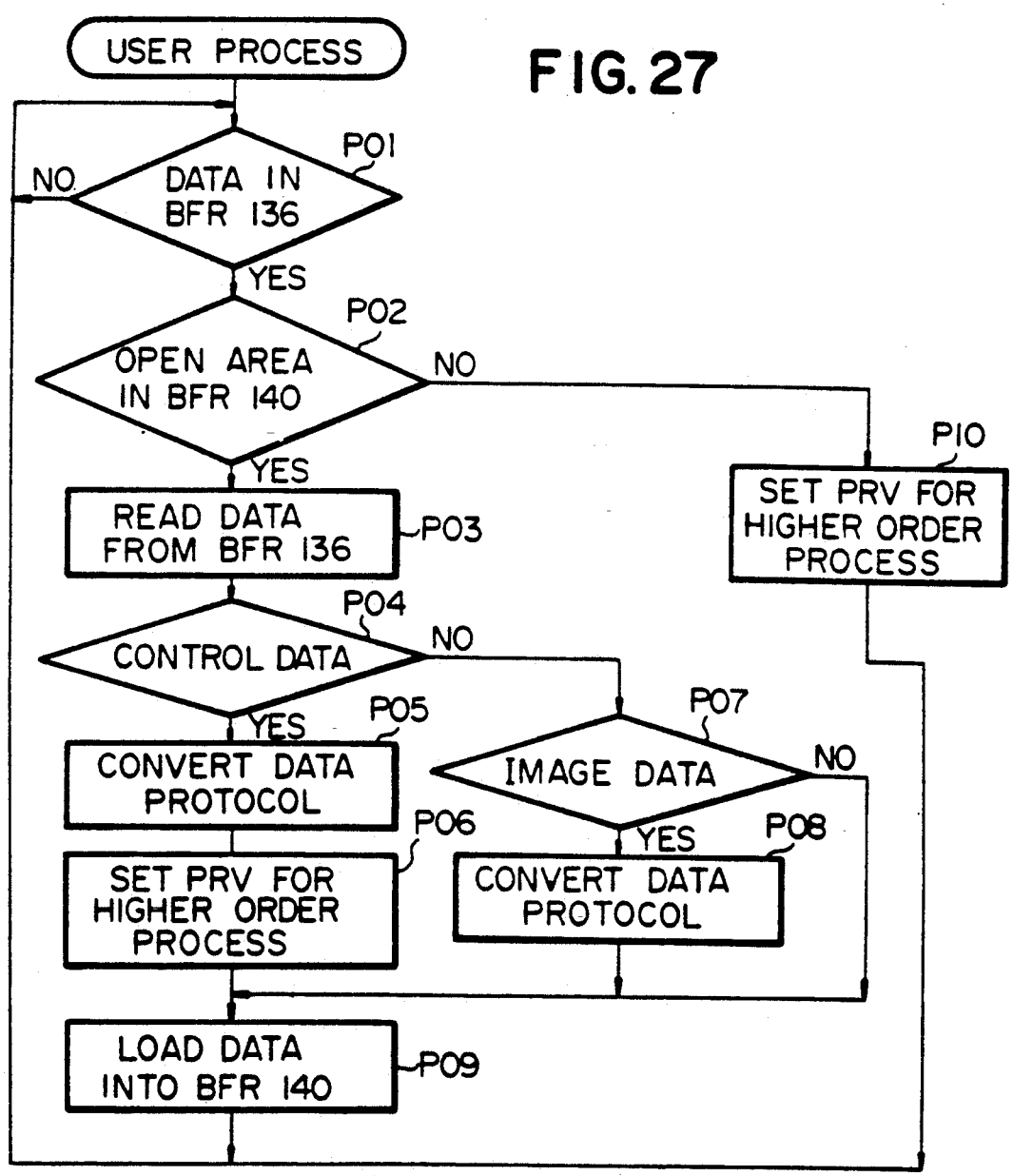
FIG. 27 is a flowchart showing the details of the user process program also stored in the system RAM unit.

When the printing operation is complete through execution of the print end subroutine, the central processing unit 120 reverts to the step J03 to repeat the process loop of the packet process program described with reference to FIGS. 21A and 21B. The flag JOBACT still having the logic "1" state, the central processing unit 120 executes the sequence of print control steps starting with the JOBOUT-II process subroutine J04. Upon termination of the JOBOUT-II process subroutine J04, the central processing unit 120 awaits until the flag EPEND shifts to logic "1" state in response to the interrupt command EXPEND to terminate the optical scanning of the original image. The details of the EXPEND interrupt subroutine are shown in FIG. 26.

Data Analysis Subroutine

Figure 25A:
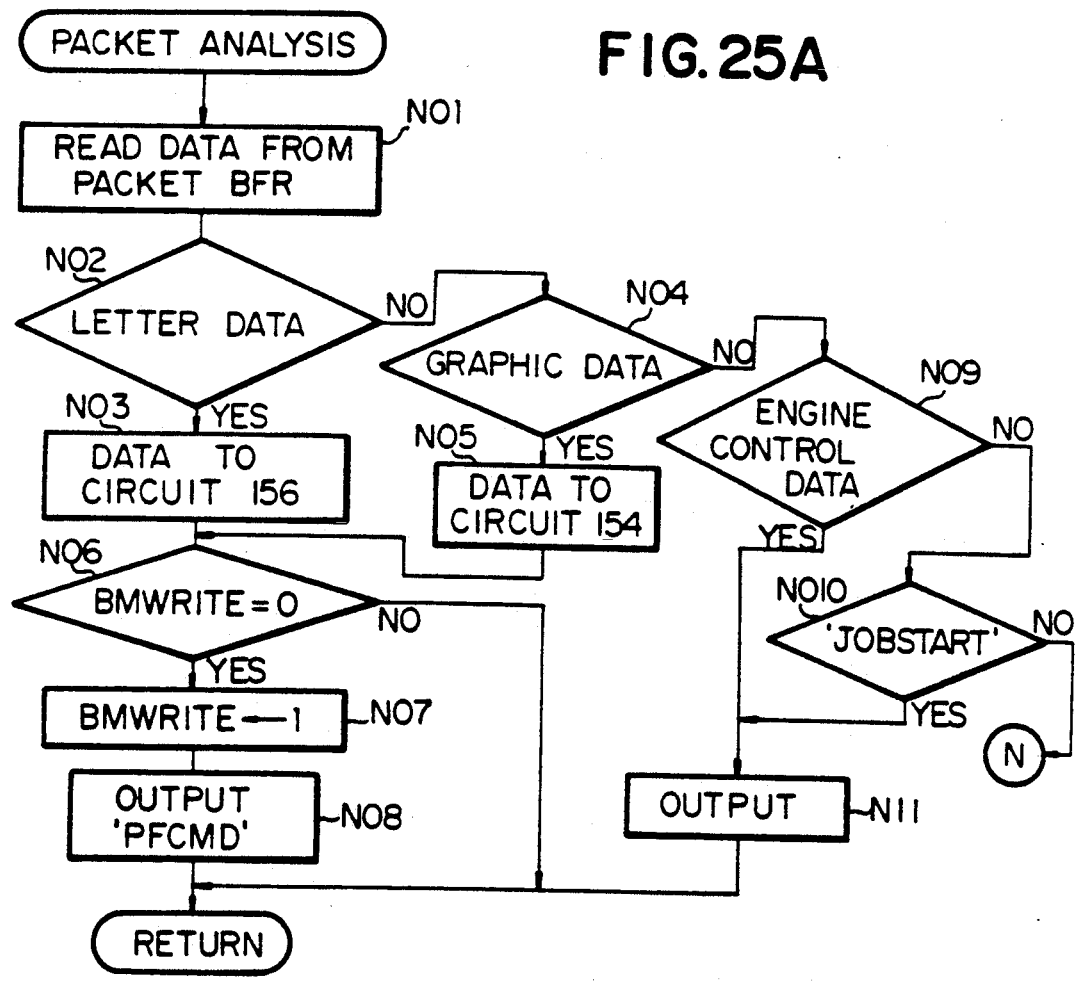
FIGS. 25A and 25B are flowcharts showing the details of the data analysis subroutine further included in the packet process program shown in the flowcharts of FIGS. 21A and 21B.
Figure 25B:
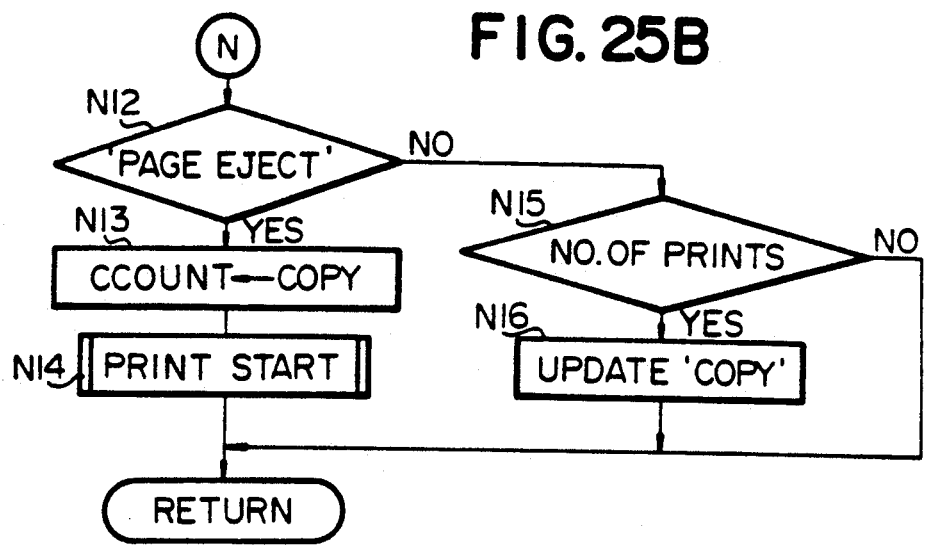

FIGS. 25A and 25B show the details of the data analysis subroutine J13 further included in the packet process program described with reference to FIGS. 21A and 21B.

The data analysis subroutine is executed to load data into the bit-map RAM unit 96 in response to function-type intermediate code signals and outputs command signals to control the operation of the print engine 42. Such a subroutine is executed when it is found at the step J12 of the packet process program that there is data stored in the form of packets or function-type intermediate code signals within the packet buffer register 138.

When it is determined at the step J12 that such data is stored in the packet buffer register 138, the central processing unit 120 reads the packet data from the packet buffer register 138 at step N01 and then queries at step N02 whether or not the packet data contains alphanumerical data. If it is found at this step N02 that the packet data read from the packet buffer register 138 contains alphanumerical data, the alphanumerical data is output to the font data read/write control circuit 156 (FIG. 11) at step N03. If it is found at the step N03 that alphanumerical data is not or no longer contained in the packet data read from the packet buffer register 138, it is further tested at step N04 whether or not the packet data contains graphic data. If it is found at this step N04 that the packet data read from the packet buffer register 138 contains graphic data, the graphic data is output to the graphic data read/write control circuit 154 (FIG. 11) at step N05. The step N03 or the step N05 is followed by a step N06 at which is tested whether or not the flag BMWRITE to request loading of data into the bit-map RAM unit 96 is of the logic "0" state indicating that the current data write cycle is the first write cycle of the printing operation to be started. If it is determined at the step N06 that the flag BMWRITE is of the logic "0", the flag is shifted to logic "1" state at step N07, whereupon the central processing unit 120 proceeds to step N08 to supply a command signal PFCMD to the interface control circuit 106 of the print engine control network 86 (FIG. 6). The command signal PFCMD is effective to enable the print engine 42 to set to preparatory steps for starting the printing operation. The bit-map data processing network 84 (FIG. 6) is now ready for printing operation. If it is determined at the step N06 that the flag BMWRITE is of the logic "1", the central processing unit 120 reverts to step N01.

When it is found at the step N04 that graphic data is not or no longer contained in the packet data read from the packet buffer register 138, it is tested at step N09 whether or not the packet data contains print engine control data to be predominant over the operation of the print engine 42. Thereafter, it is tested at step N10 whether or not the packet data read from the packet buffer register 138 includes the JOB START signal to be predominant over the grouping of pages as previously noted in connection with the data processing subroutine with reference to FIG. 17 (step C07). When it is found at the step N09 or N10 that the packet data read from the packet buffer register 138 contains the print engine control data or the JOB START signal, respectively, the data or signal is output at step N011.

It is thereafter confirmed at step N12 whether or not the PAGE EJECT signal to be predominant over the pagination of the printed output is present. When such a signal is detected at step N12, it is determined that the conversion of the signals to be used for the printing of a page is complete and, as such, the number indicated by the flag CCOUNT indicating the current number of the print sheets to be output is set for the flag COPY as at step N13. On the basis of the flag COPY which indicates the desired total number of the print sheets to be output for the same original image, the central processing unit 120 then start printing operation through execution of the print start subroutine as at step N14.

When it is confirmed at the step N12 that there is no PAGE EJECT signal predominant over the pagination of the printed output, it is checked at step N15 whether or not the desired number of the print sheets to be output for the same original image has been renewed. If the answer for this step N15 is given in the affirmative, the flag COPY is updated to represent the renewed number of print sheets at step N16.

EXPEND Interrupt Subroutine

FIG. 26 is a flowchart showing the details of the EXPEND interrupt subroutine to be used in the packet process program described with reference to FIGS. 21A and 21B. The EXPEND interrupt subroutine starts with a step Q01 at which the flag EPEND is shifted to the logic "1" state, whereupon the flag of the process request vector PRV set for the packet process program is reset at step Q02. When the command signal EXPEND is detected, the flag EPEND shifts to logic "1" state so that the central processing unit 120 proceeds to the step J06 in the packet process subroutine described with reference to FIGS. 21A and 21B so that the flag EPEND is shifted to a logic "0" state.

User Process Program

The user process program 148 is executed if and when the host protocol $P_h$ dictating the data supplied from the data processor unit 30 differs from the user protocol $P_u$ used in the printer apparatus 40. As noted previously, this program 148 is executed to convert such a host protocol $P_h$ dictating the data stored into the R buffer register 136 into a user protocol $P_u$ which can be analyzed by the host process program, and transmit data with the user protocol $P_u$ to the packet buffer register 138 via the user R buffer register 140.

The user process program 148 starts with a step P01 at which it is tested whether or not there is data stored in the R buffer register 136 of the system ROM unit 122 and, when it is found that there is data in the R buffer register 136, it is confirmed at step P02 whether or not the user R buffer register 140 has a memory area available. If it is found that there is a memory area available in the user R buffer register 140, the data is read from the R buffer register 136 at step P03, whereupon steps are followed for the conversion of the host protocol. For this purpose, it is first queried at step P04 whether or not control data is contained in the data read from the R buffer register 136 and, if it is found that this is the case, the protocol for the control data is converted at step P05. Upon termination of the process step P05, the flag of the process request vector PRV is set for the process program with a higher priority order (which process is herein assumed to be the host process program 144) as at step P06.

When it is found at the step P04 that control data for the protocol conversion is not or no longer contained in the data read from the R buffer register 136, it is first queried at step P07 whether or not image data is contained in the data read from the buffer register 136. If it is found that this is the case, the protocol for the image data is converted at step P08. Subsequently to the step P06 or the step P08, the control data or the image data with the protocol converted is loaded into the user R buffer register 140 at step P09 for transmission to the packet buffer register 138. When it is found at the step P02 that there is no data in the R buffer register 136, the flag of the process request vector PRV is set for the process program (host process program 144) with a higher priority order as at step P10.

FIG. 28 shows the timings at which the host, packet and user process programs 144, 146 and 148 are to be executed in response to the timed interrupts sent to the scheduler 150 from the central processing unit 120. It will be seen from this timing diagram that a shift is made between these host, packet and user process programs 144, 146 and 148 when request for the execution of any of the process program is cencelled.

As will have been understood from the foregoing description, a printer control system for a printer apparatus connected to an information processing unit is herein proposed which comprises means (42) for forming a visible image on a sheet medium, first memory means (138) for storing a first program (144) for deciphering instructions received from the information processing unit for enabling the image forming means to operate in accorance with the instructions, second memory means (140) for storing a second program (148)

for converting instructions received from the information processing unit into those which can be deciphered by the first memory means, and control means (80) for executing the first and second programs to control the operation of the printer apparatus, wherein the first and second programs are to be executed at controlled timings. The second program (148) is in the embodiment described implemented by the user program and may be stored in the font memory unit 96 or a built-in ROM device which may be incorporated in the central processing unit 120 or may be loaded down from the data processor unit 30. The font memory unit 96 may be implemented in the form of a cartridge detachably set to the printer apparatus 40. With use of such a second program (148), the printer apparatus acting as one of the input/output units associated with the host system implemented by the data processor unit 30 is permitted to cope with the protocol of the host system without having recourse to modification of the software configuration of the input/output unit.

What is claimed is:

1. A printer control system for a printer apparatus connected to an information processing unit, comprising:
  a) means for forming a visible image on a sheet medium,
  b) first memory means for storing a first program for deciphering instructions received from said information processing unit for enabling said image forming means to operate in accordance with the instructions,
  c) second memory means for storing a second program for converting said instructions received rom said information processing unit into those which can be deciphered by said first program,
  d) third memory means for storing said second program, said third memory means being detachably set to said printer apparatus,
  e) timing signal generating means for generating timing signals at predetermined timings, and
  f) a single data processor for alternately executing said first and second programs in response to said timing signals,
  g) the second program stored in said third memory means is loaded into said second memory means for execution.

2. A printer control system as set forth in claim 1, further comprising means for transferring said second program from said third memory means to said second memory means for storing the second program into said second memory means.

3. A printer control system as set forth in claim 1, in which said first program has a predetermined first priority and said second program has a predetermined second priority and wherein said single data processor executes the first and second programs in an order determined by the predetermined first and second priorities.

4. A printer control system as set forth in claim 1, in which the second program stored in said third memory means is loaded into said second memory means for execution.

5. A printer control system for a printer apparatus connected to an information processing unit comprising:
  a) means for forming a visible image on a sheet medium,
  b) first memory means for storing a first program for deciphering instructions received from said information processing unit for enabling said image forming means to operate in accordance with the instructions,
  c) second memory means for storing a second program for converting said instructions received from said information processing unit into those which can be deciphered by said first memory means,
  d) timing signal generating means for generating timing signals at predetermined timings,
  e) third memory means for storing a third program for designating operation timings of said first and second programs, respectively, in response to said timing signals,
  f) fourth memory means for storing said second program, said fourth memory means being detachably set to said printer apparatus,
  g) a single data processor for executing said first and second programs respectively at said designated operation timings, and
  h) control means for controlling said image forming means to operate in accordance with said instructions deciphered by said first program,
  i) the second program stored in said fourth memory means is loaded into said second memory means for execution.

6. A printer control system as set forth in claim 5, in which said first program has a predetermined first priority and said second program has a predetermined second priority and wherein said single data processor executes the first and second programs in an order determined by the predetermined first and second priorities.

7. A printer control system as set forth in claim 5, in which the second program stored in said fourth memory means is loaded into said second memory means for execution.

8. A printer control system for a printer apparatus connected to an information processing unit, comprising
  a) means for forming a visible image on a sheet medium,
  b) first buffer memory means for storing instructions received from said information processing unit, said instructions being based on a first protocol,
  c) a first program for converting the instructions stored in said first buffer memory means into instructions based on a second protocol, said first program having a predetermined first priority,
  d) second buffer memory means for storing the instructions based on said second protocol,
  e) mode selecting means for selecting one of a first mode and a second mode,
  f) a second program for deciphering the instructions stored in said first buffer memory means when the first mode is selected by said mode selecting means and the instructions stored in said second buffer memory means when the second mode is selected by said mode selecting means, said second program having a predetermined second priority,
  g) execution means for executing said first program and said second program in turn according to the value of said first priority, and
  h) control means for controlling said image forming means in accordance with the instructions deciphered by said second program.

9. A printer control system as set forth in claim 8, further comprising
   h) user memory means, and
   i) means for loading said first program into said user memory means.

10. A printer control system as set forth in claim 9, in which said mode selecting means is operative to
   select said second mode when said first program is loaded into said user memory means, and
   select said first mode when said first program is not loaded into said user memory means.

11. A printer control system as set forth in claim 10, further comprising
   j) single data processor means for executing said first program and said second program.

12. A printer control system as set forth in claim 11, further comprising
   k) timing signal generating means for generating timing signals at predetermined timings, said single data processor means being operative to execute said first program and said second program respectively at predetermined timings.

13. A printer control system for a printer apparatus connected to an information processing unit, comprising
   a) means for forming a visible image on a sheet medium,
   b) first buffer memory means for storing instructions received from said information processing unit, said instructions being based on a first protocol,
   c) user memory means,
   d) loading means for loading a first program into said user memory means, the first program being effective to convert the instructions stored in said first buffer memory means into instructions based on a second protocol and having a first priority,
   e) second buffer memory means for storing the instructions based on said protocol,
   f) host memory means for storing a second program, the second program having a second priority and being effective to
      decipher the instructions stored in said second buffer memory means when said first program is loaded into said user memory means, and
      decipher the instructions stored in said first buffer memory means when said first program is not loaded into said user memory means, and
   g) program executing means for executing said first program and said second program alternatively in accordance with the value of the first priority as compared with the value of the second priority.

14. A printer control system as set forth in claim 13, further comprising
   h) timing signal generating means for generating timing signals at predetermined timings, said program executing means for alternately executing said first program and said second program in response to said timing signals.

15. A printer control system as set forth in claim 14, in which said program executing means comprises a single data processor.

* * * * *